US012322382B2

(12) United States Patent
McCourt, Jr. et al.

(10) Patent No.: US 12,322,382 B2
(45) Date of Patent: Jun. 3, 2025

(54) TOPIC-BASED SEMANTIC SEARCH OF ELECTRONIC DOCUMENTS BASED ON MACHINE LEARNING MODELS FROM BAYESIAN BELIEF NETWORKS

(71) Applicant: INVOCA, INC., Santa Barbara, CA (US)

(72) Inventors: Michael Kingsley McCourt, Jr., Santa Barbara, CA (US); Kian Ghodoussi, Los Angeles, CA (US); Victor Borda, Santa Barbara, CA (US)

(73) Assignee: Invoca, Inc., Santa Barbara, CA (US)

( * ) Notice: Subject to any disclaimer, the term of this patent is extended or adjusted under 35 U.S.C. 154(b) by 266 days.

(21) Appl. No.: 18/185,496

(22) Filed: Mar. 17, 2023

(65) Prior Publication Data

US 2024/0312451 A1 Sep. 19, 2024

(51) Int. Cl.
*G10L 15/22* (2006.01)
*G06F 16/338* (2019.01)
(Continued)

(52) U.S. Cl.
CPC ........ *G10L 15/1815* (2013.01); *G06F 16/338* (2019.01); *G06F 16/35* (2019.01);
(Continued)

(58) Field of Classification Search
CPC ... G10L 15/1815; G10L 15/063; G10L 15/22; G10L 15/197; G10L 13/02; G10L 15/04;
(Continued)

(56) References Cited

U.S. PATENT DOCUMENTS 10,847,140 B1 * 11/2020 Conner ............... G10L 15/1815
11,410,644 B2 * 8/2022 McCourt .................. G06N 5/04
(Continued)

FOREIGN PATENT DOCUMENTS

CA 3052174 A1 2/2020
CA 3083303 A1 4/2021
EP 4134839 A1 2/2023

OTHER PUBLICATIONS

Anindya Bhadra, "Horseshoe Regularization for Machine Learning in Complex and Deep Models", Purdue University, 2019, retrieved Jun. 19, 2023; 29 pages.
(Continued)

*Primary Examiner* — Vijay B Chawan
(74) *Attorney, Agent, or Firm* — Baker Botts L.L.P.

(57) ABSTRACT

A computer-implemented method executed using a computing device comprises digitally generating and storing a machine learning statistical topic model in computer memory, the topic model being programmed to model call transcript data representing words spoken on a call as a function of one or more topics of a set of topics, the set of topics being modeled to comprise a set of pre-seeded topics and a set of non-pre-seeded topics, and the one or more topics being modeled as a function of a probability distribution of topics; programmatically pre-seeding the topic model with a set of keyword groups, each keyword group associating a respective set of keywords with a topic of the set of pre-seeded topics; programmatically training the topic model using unlabeled training data; conjoining a classifier to the topic model to create a classifier model, the classifier defining a joint probability distribution over topic vectors and one or more observed labels; programmatically training the classifier model using labeled training data; receiving
(Continued)

target call transcript data comprising an electronic digital representation of a verbal transcription of a target call; programmatically determining, using the classifier model, at least one of one or more topics of the target call or one or more classifications of the target call; digitally storing the target call transcript data with additional data indicating the determined one or more topics of the target call and/or the determined one or more classifications of the target call; accessing, in computer storage, a first digitally stored electronic document comprising a first text; receiving computer input specifying a search query comprising one or more search terms; processing the search query using the classifier model to output a query topic vector representing a thematic content of the search query; processing the first text using the classifier model to output and store in the computer memory a first plurality of topic vectors each representing a topic in the text; using the query topic vector and the first plurality of topic vectors, calculating a plurality of similarity values, each of the similarity values representing a similarity of the query topic vector to a particular topic vector among the first plurality of topic vectors; outputting a visual display that specifies one or more topic vectors among the first plurality of topic vectors having one or more corresponding similarity values that are greater than a specified threshold similarity value.

30 Claims, 10 Drawing Sheets

(51) Int. Cl.

| | |
|---|---|
| ***G06F 16/35*** | (2019.01) |
| ***G10L 15/06*** | (2013.01) |
| ***G10L 15/10*** | (2006.01) |
| ***G10L 15/14*** | (2006.01) |
| ***G10L 15/18*** | (2013.01) |
| ***G10L 15/197*** | (2013.01) |

(52) U.S. Cl.
CPC ............ *G10L 15/063* (2013.01); *G10L 15/10* (2013.01); *G10L 15/14* (2013.01); *G10L 15/197* (2013.01); *G10L 15/22* (2013.01)

(58) Field of Classification Search
CPC ....... G10L 15/10; G10L 15/14; G10L 15/183; G10L 15/1822; G10L 15/26; G06F 40/216; G06F 40/30; G06F 40/279; G06F 40/284; G06F 40/211; G06F 40/247; G06F 40/295; G06F 40/40; G06F 16/35; G06F 16/3347; G06F 16/338; G06F 16/33; G06N 20/00
USPC ..................................... 704/9, 235, 270, 275
See application file for complete search history.

(56) References Cited

U.S. PATENT DOCUMENTS

| | | | | |
|---|---|---|---|---|
| 11,429,901 | B1 * | 8/2022 | McCourt | G06N 7/01 |
| 2011/0213655 | A1 * | 9/2011 | Henkin | G06Q 30/00<br>707/E17.061 |
| 2015/0293976 | A1 * | 10/2015 | Guo | G06N 3/045<br>707/706 |
| 2019/0057310 | A1 * | 2/2019 | Olmstead | G06N 5/02 |
| 2020/0074312 | A1 * | 3/2020 | Liang | G06N 5/02 |
| 2020/0250269 | A1 * | 8/2020 | Koseki | G06N 3/045 |
| 2021/0118433 | A1 * | 4/2021 | McCourt | G10L 15/183 |
| 2023/0140125 | A1 * | 5/2023 | Glesinger | G06N 3/08<br>704/9 |
| 2024/0312451 | A1 * | 9/2024 | Mccourt, Jr. | G06F 16/338 |

OTHER PUBLICATIONS

Carlos Guestrin, "L2 Regularization for Logistic Regression: Case Study 1: Estimating Click Probabilities", Machine Learning/ Statistics for Big Data (CSE599C1/STAT592), University of Washington, Jan. 10, 2013, 17 pages.

Aki Vehtari, "Regularized Horseshoe," Aalto University, Finland, StanCon 2018, Asilomar Conference Grounds, Pacific Grove, California, 53 pages.

Yuhang Cai and Lek-Heng Lim, "Distances between probability distributions of different dimensions," IEEE Transactions on Information Theory, arXiv:2011.00629v3 [math.ST] Jan. 30, 2022, 12 pages.

European Patent Office, Extended European Search Report for Application No. 23170670.6-1203, dated Sep. 20, 2023, pp. 1-9.

* cited by examiner

TOPIC-BASED SEMANTIC SEARCH OF ELECTRONIC DOCUMENTS BASED ON MACHINE LEARNING MODELS FROM BAYESIAN BELIEF NETWORKS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2022 Invoca, Inc.

TECHNICAL FIELD

One technical field of the disclosure is computer-implemented artificial intelligence, in the subfield of natural language processing, using models that are programmed to automatically categorize natural language data. Another technical field is improvements to Bayesian Belief Network models and model generation techniques. Another technical field is semi-supervised machine learning model development, training, and deployment. Other technical fields include representation learning, active learning in the field of machine learning, and semantic search of large databases of electronic documents having natural language text.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Automatic classification of written and verbal communications can be extremely useful for grouping large numbers of communications for review, analysis, or intervention. While there are many known techniques for the classification of written communications, such techniques typically require either design by an expert or a large amount of labeled training data. In either case, such models can be prohibitively expensive to curate. Moreover, many classification techniques in common use cannot readily be interpreted, and therefore may not be suitable in circumstances where auditing for fairness or correctness must be provided.

Conversely, a conventional admixture model, otherwise known as a topic model, may be leveraged to impose an underlying semantic structure on a data set without the need for any labeled training data. With an admixture model, topics representing recurring thematic elements in a dataset can be represented as mixtures of words or probability distributions over words. However, conventional admixture models are subject to certain disadvantages.

For example, conventional admixture models may be incapable of using labeled training data or accounting for themes known or assumed to exist within a data set based on prior knowledge. These limitations may necessitate using a large amount of unlabeled training data to impose a semantic structure on the data set. Moreover, while a conventional admixture may generate topics associated with words determined to be related, each of these generated topics will initially be unnamed. Hence, a large amount of human intervention is typically required to interpret the output of a conventional admixture model and ascribe pragmatic meaning to the topics found to exist in a data set.

The properties of the topic representation enable the model to create a distinctive representation of any input text. Such representation may be used to measure the similarity between any pair of inputs. As described below, this enables us to use admixture topic models for information retrieval, without the need for labeled data, and without the need for explicit human intervention to interpret the topics.

SUMMARY

The appended claims may serve as a summary of the invention.

DETAILED DESCRIPTION

Figure 1A:
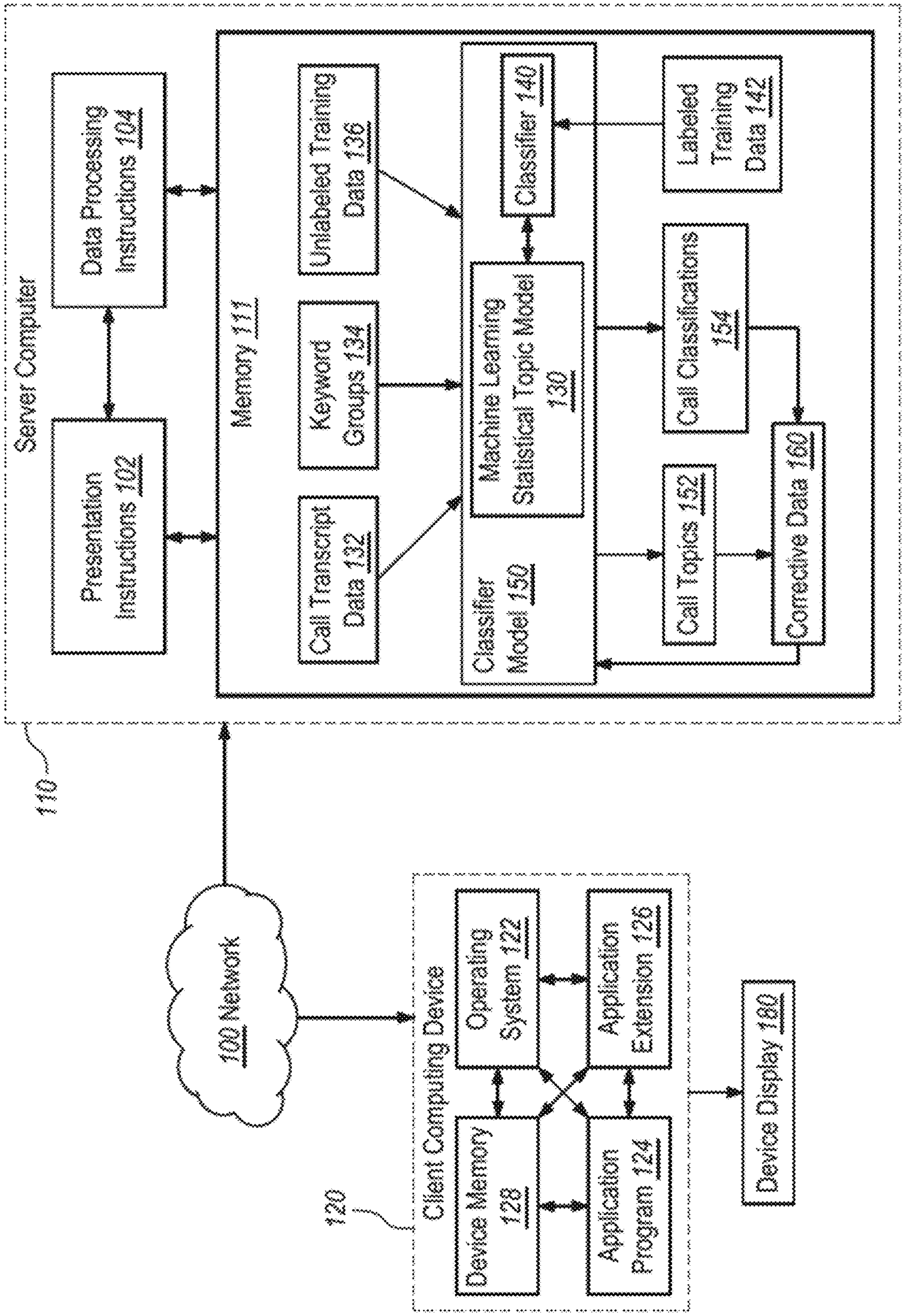
FIG. 1A illustrates a distributed computer system showing the context of use and principal functional elements with which one embodiment could be implemented.

In the following description, for the purposes of explanation, numerous specific details are set forth to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program the computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in the sections below according to the following outline:

1. General Overview
2. Structural & Functional Overview
2.1 Distributed Computer System Example
2.2 Model Foundation
2.3 Description Of Example Dataset
2.4 Semantic Similarity Measurement
2.4.1 Calls With Virtually No Semantic Overlap
2.4.2 Calls With Substantial Semantic Overlap
2.5 Scalable Implementation In Database Systems
2.6 Review Of Examples
3. Addressing Cold Start In Active Learning
3.1 Overview
3.2 Auditing And Modifying The Search Criterion
4. Implementation Example—Hardware Overview

1. General Overview

Computer-implemented natural language processing (NLP) algorithms based on a representation learning model have been developed for automated analysis and extraction of data from digitally stored electronic documents. An example application is the semantic analysis of the contents of voice calls to customer service representatives of business enterprises. The representation learning model is analogous to a deep learning model but uses a structured Bayesian belief network in lieu of an artificial neural network. U.S. Pat. No. 11,410,644 discloses the implementation of an example representation learning model. In an embodiment, a machine learning model based on a structured Bayesian belief network can receive, as input, text that is unstructured and not categorized. The model like that described in the preceding section is fit to or trained on, digitally stored electronic text representations of transcripts of a set of calls. The dataset may be labeled in part and may be augmented with keyword definitions. The properties of the topic representation enable the model to create a distinctive representation of any input text. Moreover, this representation is directly interpretable in terms of the input's thematic content as inferred from the original training dataset. In an embodiment, topic vectors of the model may be used to measure the similarity between any pair of calls. Once the model is trained, it can transform any text input into its topic representation. Embodiments are described for determining the semantic similarity of pairs of texts, for comparing texts to a free-form search query, and for comparing portions of a call to a query. While certain embodiments are described, for convenience, in the context of digitally electronically stored transcripts of recorded voice calls, and any two types of text may be compared using this technique, though they should be related in some way to the original training dataset for the results to be meaningful.

Embodiments effectively transform a text into a fixed-length, numeric, representation and execute a search in that numeric space. However, the present approach offers numerous improvements over prior approaches like term frequency-inverse document frequency (tf-idf) and Sentence-BERT, as detailed in other sections. Rather than vectors, the model used in the present disclosure produces probability distributions with key benefits over the prior approaches, as further described in other sections.

In various embodiments, the disclosure encompasses the subject matter of the following numbered clauses:

1. A computer-implemented method executed using a computing device, the method comprising: digitally generating and storing a machine learning statistical topic model in computer memory, the topic model being programmed to model call transcript data representing words spoken on a call as a function of one or more topics of a set of topics, the set of topics being modeled to comprise optionally a set of pre-seeded topics and a set of non-pre-seeded topics, and the one or more topics being modeled as a function of a probability distribution of topics; programmatically pre-seeding the topic model with a set of keyword groups, each keyword group associating a respective set of keywords with a topic of the set of pre-seeded topics; programmatically training the topic model using unlabeled training data; automatically conjoining a classifier to the topic model to create a classifier model, the classifier defining a joint probability distribution over topic vectors and one or more observed labels; programmatically training the classifier model using labeled training data; receiving target call transcript data comprising an electronic digital representation of a verbal transcription of a target call; programmatically determining, using the classifier model, at least one of one or more topics of the target call or one or more classifications of the target call; digitally storing the target call transcript data with additional data indicating the determined one or more topics of the target call and/or the determined one or more classifications of the target call; accessing, in computer storage, a first digitally stored electronic document comprising a first text; receiving computer input specifying a search query comprising one or more search terms; processing the search query using the classifier model to output a query topic vector representing a thematic content of the search query; processing the first text using the classifier model to output and store in the computer memory a first plurality of topic vectors each representing a topic in the text; using the query topic vector and the first plurality of topic vectors, calculating a plurality of similarity values, each of the similarity values representing a similarity of the query topic vector to a particular topic vector among the first plurality of topic vectors; outputting a visual display that specifies one or more topic vectors among the first plurality of topic vectors having one or more corresponding similarity values that are greater than a specified threshold similarity value. The term "programmatically," in this disclosure, refers to using stored program control of a digital computer and programmed techniques such as function calls, API calls, or execution of programmed algorithms to implement the functions that are described.

2. The method of clause 1, further comprising: before the comparing, sorting the first plurality of topic vectors according to a corpus-level prevalence of the topics represented in the first plurality of topic vectors, thereby creating a first set of sorted topic vectors; executing the comparing according to an order of the first set.

3. The method of clause 2, further comprising: accessing a second digitally stored electronic document comprising a second text; processing the second text using the trained classifier model to output a second plurality of topic vectors each representing another topic in the second text; sorting the second plurality of topic vectors based upon the corpus-level prevalence of the topics represented in the second plurality of topic vectors, thereby creating a second set of sorted topic vectors; comparing the first set to the second set; outputting a visual display indicating an overlap of the topics in the first set and the second set.

4. The method of clause 3, further comprising performing the similarity calculation by calculating a distance metric that measures a similarity of the first set and the second set.

5. The method of clause 4, further comprising calculating the distance metric as any of a Hellinger distance, a Jensen-Shannon divergence, a total variation distance, or a Wasserstein metric.

6. The method of clause 3, further comprising outputting a second visual display indicating prevalence values corresponding to the prevalence, in the corpus comprising the first text, the second text, and a plurality of other texts, of the topics in the first set and the second set.

7. The method of clause 1, further comprising executing the processing of the search query using a first structured query language (SQL) query to transform the search query into the query topic vector.

8. The method of clause 7, further comprising calculating the plurality of similarity values using a second SQL query to calculate a distance metric.

9. The method of clause 8, further comprising calculating the distance metric as any of a Hellinger distance, a Jensen-Shannon divergence, a total variation distance, or a Wasserstein metric.

10. The method of clause 1, wherein the first text comprises a digitally stored text transcript of a previously recorded voice call.

11. The method of clause 1, wherein the first text comprises a first digitally stored text transcript of a previously recorded first voice call, and wherein the one or more search terms comprise a selected portion of a second digitally stored text transcript of a previously recorded second voice call.

12. The method of clause 1, each vector in the first plurality of topic vectors being a probability distribution.

13. The method of clause 1, the classifier model being untrained, the method further comprising: receiving a plurality of training queries, each of the training queries comprising one or more terms; using the classifier model, a corpus of digitally stored text documents, and the plurality of training queries, inferentially processing each of the training queries to output a set of training topics corresponding to inferred thematic contents of the training queries; using the classifier model and the corpus, processing the corpus to output a set of document topics corresponding to inferred thematic contents of the text documents in the corpus; calculating a plurality of training similarity values that measure similarities of the training topics to the document topics; identifying a set of similar text documents that have training similarity values greater than a specified similarity threshold; visually outputting portions of the similar text documents that are associated with document topics that are similar to the training topics.

14. The method of clause 13, further comprising visually highlighting one or more words of the portions of the similar text documents that are similar to one of the training queries.

15. The method of clause 13 or 14, further comprising: receiving input specifying one or more of the portions; in response to the input, updating the training queries by performing one of: adding the portions that were specified via the input to the plurality of training queries; or replacing the plurality of the training queries with the portions that were specified via the input; and repeating the process of clause 13 using the training queries.

2. Structural & Functional Overview

2.1 Distributed Computer System Example

Embodiments can be implemented at least in part using the computing architectures and machine learning model architectures disclosed in U.S. Pat. No. 11,429,901, which describes digitally generating and storing a machine learning statistical topic model in computer memory, the topic model being programmed to model call transcript data representing words spoken on a call as a function of one or more topics of a set of topics that includes pre-seeded topics and non-pre-seeded topics; programmatically pre-seeding the topic model with a set of keyword groups; programmatically training the topic model using unlabeled training data; conjoining a classifier to the topic model to create a classifier model; programmatically training the classifier model using labeled training data; receiving target call transcript data; programmatically determining at least one of one or more topics of the target call and optionally one or more classifications of the target call, and digitally storing the target call transcript data with additional data indicating the determined topics and/or classifications of the target call.

In an embodiment, a computer system of FIG. 1A comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1A illustrates only one of many possible arrangements of components configured to execute the programming described herein. Other arrangements may include fewer or different components, and the division of work between the components may vary depending on the arrangement.

FIG. 1A illustrates a distributed computer system showing the context of use and principal functional elements with which one embodiment could be implemented. In one embodiment, distributed computer system 110 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1A illustrates only one of many possible arrangements of components configured to execute the programming described herein. Other arrangements may include fewer or different components, and the division of work between the components may vary depending on the arrangement.

FIG. 1A, the other drawing figures, and all the descriptions and claims in this disclosure, are intended to present, disclose, and claim a wholly technical system with wholly technical elements that implement technical methods. In the disclosure, specially programmed computers, using a special-purpose distributed computer system design, execute functions that have not been available before in a new manner using instructions ordered in a new way, to provide a practical application of computing technology to the technical problems identified in the Background. Every step or operation that is functionally described in the disclosure is intended for implementation using programmed instructions that are executed by a computer. In this manner, the disclosure presents a technical solution to a technical problem, and any interpretation of the disclosure or claims to cover any judicial exception to patent eligibility, such as an abstract idea, mental process, method of organizing human activity, or mathematical algorithm, has no support in this disclosure and is erroneous.

In one embodiment, a distributed computer system comprises a server computer 110 that is communicatively coupled to client computing device 120 over network 100. Network 100 broadly represents any combination of one or more data communication networks including local area networks, wide area networks, internetworks, or internets, using any of wireline or wireless links, including terrestrial or satellite links. The network(s) may be implemented by any medium or mechanism that provides for the exchange of data between the various elements of FIG. 1A. The various elements of FIG. 1 may also have direct (wired or wireless) communication links. The server computer 110, the client computing device 120, and other elements of the system may each comprise an interface compatible with the network 100 and may be programmed or configured to use standardized protocols for communication across the networks such as TCP/IP, Bluetooth, or higher-layer protocols such as HTTP, TLS, and the like.

In one embodiment, client computing device 120 may be a computer that includes hardware capable of communicatively coupling the device to one or more server computers, such as server computer 110, over one or more service providers. For example, the client computing device 120 may include a network card that communicates with server computer 110 through a home or office wireless router that is communicatively coupled to an internet service provider. The client computing device 120 may be a smartphone, personal computer, tablet computing device, PDA, laptop, or any other computing device capable of transmitting and receiving information and performing the functions described herein.

In one embodiment, the client computing device 120 may comprise device memory 128, operating system 122, application program 124, and application extension 126. In one embodiment, client computing device 120 hosts and executes the application program 124, which the client computing device 120 may download and install from server computer 110, an application store, or another repository. The application program 124 is compatible with server computer 110 and may communicate with the server computer 110 using an app-specific protocol, parameterized HTTP POST and GET requests, and/or other programmatic calls. In some embodiments, application program 124 comprises a conventional internet browser application that can communicate over network 100 to other functional elements via HTTP and is capable of rendering dynamic or static HTML, XML, or other markup languages, including displaying text, images, accessing video windows and players, and so forth. In some embodiments, server computer 110 may provide an application extension 126 for application program 124 through which the foregoing kinds of communication and other functionality may be implemented. In embodiments, a device display 180, such as a screen, may be coupled to the client computing device 120.

The server computer 110 may be implemented using a server-class computer or other computer having one or more processor cores, co-processors, or other computers. The server computer 110 may be a physical server computer and/or virtual server instance stored in a data center, such as through cloud computing. In one embodiment, server computer 110 may be implemented using two or more processor cores, clusters, or instances of physical machines or virtual machines, configured in a discrete location or co-located with other elements in a data center, shared computing facility, or cloud computing facility.

In one embodiment, server computer 110 may comprise data processing instructions 104 coupled to both presentation instructions 102 and memory 111. Memory 111 may represent any memory accessible by the server computer 110 including a relational database, a data lake, cloud data storage, local hard drives, computer main memory, or any other form of electronic memory. In various embodiments, server computer 110 may store and execute sequences of programmed instructions of various types to cause the execution of various methods. As one example, server computer 110 may execute the data processing instructions 104 and the presentation instructions 102 in various programmed methods, but server computer 110 may also execute other types of programmed instructions in one or more embodiments. The data processing instructions 104 may be executed by the server computer 110 to process or transform data, such as by executing a programmed machine learning model, or to cause data stored in memory 111 to be transmitted to client computing device 120 over the network 100. In various embodiments, presentation instructions 102 may be executed by server computer 110 to cause presentation in a display of a computing device communicating with server computer 110 over network 100, such as client computing device 120, or to cause the transmission of display instructions to such a computing device, the display instructions formatted to cause such presentation upon execution.

Rather than comprising a general-purpose computer, the server computer 110 is specially configured or programmed with the functional elements shown in FIG. 1A. In one embodiment, server computer 110 is programmed to receive call transcript data 132 comprising call transcripts over network 100 from client computing device 120 and to store the call transcript data. In one embodiment, call transcript data 132, including one or more call transcripts, is stored in memory 111 of server computer 110. Each call transcript may comprise an electronic digital representation of a verbal transcription of a call between two or more parties. For example, a call transcript for a call dealership may comprise a written dialogue between an agent and a customer that has been transcribed from an audio conversation between the agent and the customer. The call transcripts may include data labeling portions of the dialogue with identifiers of the parties and/or party types. For example, when used for conversations between a customer and a goods or services provider, the portions of the dialogue may be labeled based on whether the portions were spoken by a customer or by an agent of the goods or services provider.

Referring again to FIG. 1A, in one embodiment, server computer 110 may execute programmed instructions formatted to cause generating and/or digitally storing a classifier model 150 comprising a machine learning statistical topic model 130 and a classifier 140. In one embodiment, the machine learning statistical topic model 130 is programmed to model call transcript data representing words spoken on a call as a function of one or more topics of a set of topics, the set of topics being modeled to comprise a set of pre-seeded topics and a set of non-pre-seeded topics, and the one or more topics being modeled as a function of a probability distribution of topics. The classifier model 150 may comprise computer-readable instructions which, when executed by one or more processors, cause the server computer 110 to compute one or more output outcomes or labels based on input call transcripts. The classifier model 150 may comprise a mathematical model that is trained at the server computer 110 or trained at an external computing device and provided to the server computer 110. In some embodiment, the classifier model 150 is digitally stored in memory 111 of server computer 110. In some embodiments, the classifier model 150 may instead be digitally stored in device memory 128 of client computing device 120 after it is trained at the server computer 110.

In one embodiment, server computer 110 may execute programmed instructions formatted to cause pre-seeding of the machine learning statistical topic model 130 with a set of keyword groups 134, each keyword group associating a respective set of keywords with a topic of the set of pre-seeded topics. For example, the machine learning statistical topic model 130 may be programmed to model each word represented in the call transcript data 132 as being drawn from one or more topic probability distributions of a plurality of topic probability distributions, the plurality of topic probability distributions comprising a plurality of mixture topic probability distributions each modeled as being drawn from a first type of prior distribution and being associated with a pre-seeded topic and a plurality of non-mixture topic probability distributions each modeled as being drawn from a second type of prior distribution and being associated with a non-pre-seeded topic. In one embodiment, the keyword groups 134 are stored in memory 111 of server computer 110. In one embodiment, digital input specifying one or more of the keyword groups 134 or pre-seeded topics is received, at server computer 110, from client computing device 120, over network 100.

In one embodiment, server computer 110 may execute programmed instructions formatted to cause training the topic model using unlabeled training data 136. In one embodiment, the unlabeled training data 136 may comprise an initial set of call transcript data, each call transcript data of the initial set of call transcript data comprising an electronic digital representation of a verbal transcription of a call between a first person of a first person type and a second person of a second person type, the initial set of call transcript data having been created based on speech-to-text recognition of audio recordings of an initial set of calls. In various embodiments, the classifier 140 may be conjoined with the machine learning statistical topic model 130, either before or after the pre-seeding with keyword groups 134 or the training with unlabeled training data 136 at the server computer 110. In various embodiments, the classifier 140 may be programmed as a linear classifier comprising one of a Finnish Horseshoe Model, an L2 Logistic Regression, or a Logistic Regression using the Horseshoe Potential, or as another type of classifier, linear or nonlinear.

In one embodiment, server computer 110 may execute programmed instructions formatted to cause training the classifier model 150 using labeled training data 142, which may be stored in memory 111. In one embodiment, the classifier model 150 is initially trained with a set of labeled training data 142 annotated by human domain-specific experts and subsequently updated through active learning.

In one embodiment, server computer 110 may execute programmed instructions formatted to cause inputting call transcript data 132 into the classifier model 150 to automatically evaluate one or more call transcripts. Using the classifier model 150, as described further herein, the server computer 110 may execute programmed instructions formatted to identify one or more abstract representations for the call transcripts, which are then used to programmatically predict outcomes or call classifications 154 (in other words, classification labels) for the calls. In one embodiment, server computer 110 may execute programmed instructions formatted to cause determining one or more call topics 152 for each call. Server computer 110 may then execute programmed instructions formatted to cause digitally storing the call transcripts with data identifying the one or more representations, outcomes, labels, or topics. In one embodiment, server computer 110 is programmed to store additional data relating to the one or more representations, outcomes, labels, or topics. In some embodiments, the server computer 110 may execute programmed instructions formatted to remove a call transcript from digital storage after its representations have been identified.

In one embodiment, additional data stored with call transcripts include explainability data related to the labeling of one or more topics or the prediction of one or more outcomes or labels. Bayesian models, such as the models of the present disclosure, may have technical advantages over neural models which tend to be "black box," in that the Bayesian models can be programmed to output robust explainability data. Here, data may be represented in the form of topics. Thus, server computer 110 may be programmed, in an embodiment, to execute instructions formatted to cause highlighting or other identification of one or more topics in a digital representation of a call transcript which contributed most to a predicted label or outcome. In an embodiment, this highlighting or identification is instead, or additionally, effectuated on a per-word level, wherein one or more words in the call transcript data 132 most predictive of an assigned label or outcome are highlighted or otherwise identified in a digital representation of a call transcript. In one embodiment, server computer 110 may also execute programmed instructions formatted to cause the generation and digital storage in memory 111 of explainability summary data which aggregates or summarizes batches of the explainability data.

In one embodiment, server computer 110 stores corrective data 160 in memory 111. Server computer 110 may execute programmed instructions formatted to generate and/or digitally store the corrective data 160 based on the digitally stored call topics 152 and the digitally stored call classifications 154 as part of a programmed active learning process. For example, server computer 110 may transmit programmed instructions to client computing device 120 formatted to cause display of a prompt in a graphical user interface displayed on device display 180. The prompt may query a user of client computing device 120 to provide feedback on whether one or more call topics 152 or call classifications 154 predicted by server computer 110 are accurate for one or more calls. Responsive to receiving reply input from client computing device 120, server computer 110 may update the classifier model 150 digitally stored in memory 111. In one embodiment, updating the classifier model 150 through an active learning process may occur regularly or automatically as server computer 110 receives feedback input from client computing device 120. In one embodiment, the corrective data 160 represents batches of feedback that may be processed only after a triggering condition is met. For example, responsive to determining at the server computer 110, based on a set of feedback input comprising a first feedback input, that prediction accuracy of the classifier model 150 is below a threshold prediction accuracy, server computer 110 may execute programmed instructions formatted to cause updating the classifier model 150 using the corrective data 160. In some embodiments, a corrective data set can be formed from the corrective data 160 and used to update the classifier model 150 to improve the accuracy of its predictions. In an embodiment, the corrective data set may also include information from one or more new batches of unlabeled calls.

In one embodiment, the server computer generates representation and category data 118 from a plurality of categorized call transcripts. The representation and category data 118 may comprise aggregated information from a plurality of categorized call transcripts. For example, the representation data may identify each of a plurality of thematic elements, the average length of time spent on each theme per call, the total amount of time spent on each theme, and/or other aggregated information regarding the call transcripts or modeled representations.

In some embodiments, to execute the various techniques described in this disclosure, server computer 110 may execute functions defined or specified in one or more code libraries, information of which may be stored in memory 111 or dynamically accessible by server computer 110.

For purposes of illustrating a clear example, FIG. 1A shows a limited number of instances of certain functional elements. However, in other embodiments, there may be any number of such elements. For example, embodiments with multiple client computing devices may include a first client computing device or first plurality of client computing devices which sends the call transcripts to the server computer and a second client computing device or second plurality of client computing devices which receives the representation, outcome, and label data from the server computer. Further, the server computer 110 may be implemented using two or more processor cores, clusters, or instances of physical machines or virtual machines, configured in a discrete location or co-located with other elements in a data center, shared computing facility, or cloud computing facility.

2.2 Model Foundation

Figure 1B:
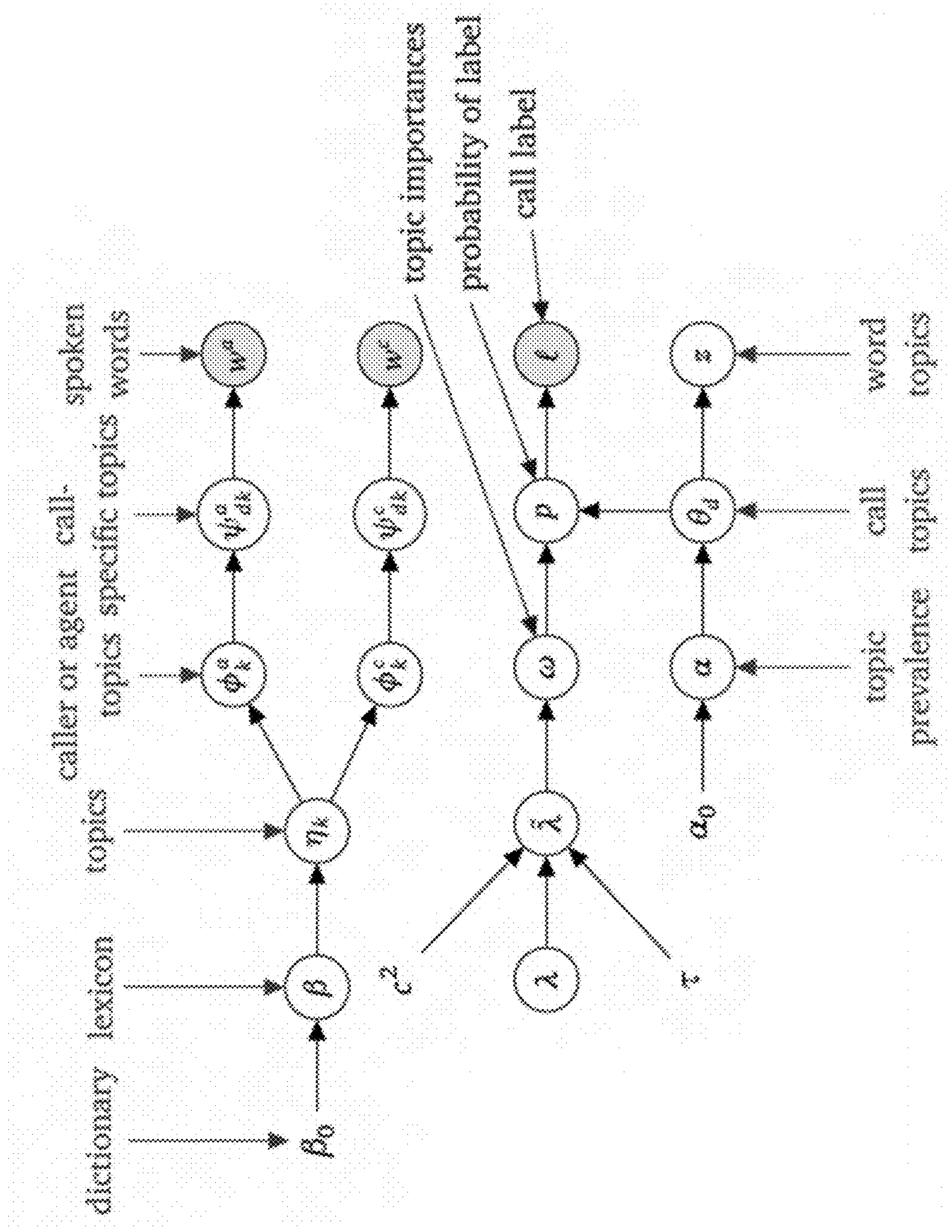
FIG. 1B illustrates one example of a computer-implemented NLP processing model that could be used in an embodiment of the techniques herein.

FIG. 1B illustrates one example of a computer-implemented NLP processing model that could be used in an embodiment of the techniques herein. A belief network that is structured as in FIG. 1B contains an explicit hierarchical and statistical structure that is appropriate for NLP. Since this structure is integral to the model, learning the structure from training data or data under evaluation is not required. Furthermore, the statistical nature of the model precludes over-fitting the data. Therefore, models like FIG. 1B are highly efficient and can produce useful output even with datasets that are extremely small when compared to those required by neural network-based models.

A belief network model like FIG. 1B can receive, as input, text that is unstructured and not categorized. In FIG. 1B, labels l denote labeled input data, and when labeled data is present, the model will take the labels into account. In some embodiments, keyword groups specified by the user can be specified. Additions of this kind can assist the model to train on smaller datasets and can offer control to the user concerning what the model learns from the data, but they are not required.

A key feature of the model of FIG. 1B is topics, denoted $\eta$. Alternatively, caller-specific variations and agent-specific variations are denoted $\phi^c$ and $\phi^a$, respectively. Call topics are denoted $\Theta$ in FIG. 1B. Subsequent sections discuss the topic prevalence, denoted as $\alpha$ in FIG. 1B. The foregoing elements are formally defined only as seen in FIG. 1B, which represents a large equation fit to the data available to the inventors. The foregoing elements function in part as follows:

1. The topics $\eta$ or $\phi$ represent recurring themes in the dataset. These are abstract entities that the model learns from the data but can be viewed as probability distributions over words.
2. Each individual call comprises a mixture of topics referred to as call topics $\Theta$. The components of $\Theta$ represent a probability distribution over topics; consequently, these components all are positive and sum to "1". The call topics $\Theta$ detail the model's inference of what each call is about.
3. The topic prevalence a is also a probability distribution over topics, analogous to $\Theta$. Rather than representing a single call, however, the components of a represent the proportion of each topic in the entire dataset. The prevalence a serves as a prior for the call topics $\Theta$.

Figure 1C:
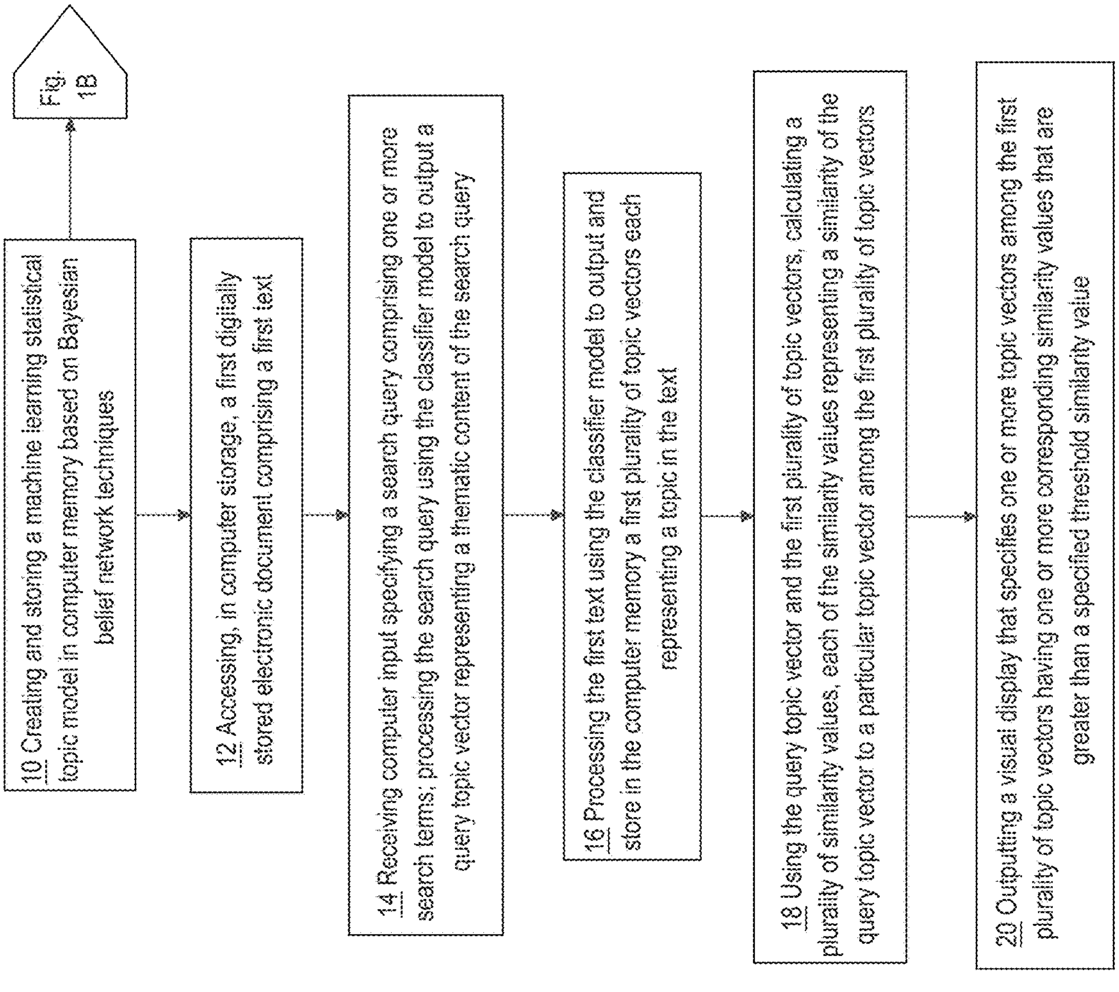
FIG. 1C illustrates an example computer-implemented process that can be programmed as part of an embodiment.

FIG. 1C illustrates an example computer-implemented process that can be programmed as part of an embodiment. FIG. 1C and each other flow diagram herein is intended as an illustration at the functional level at which skilled persons, in the art to which this disclosure pertains, communicate with one another to describe and implement algorithms using programming. The flow diagrams are not intended to illustrate every instruction, method object, or sub-step that would be needed to program every aspect of a working program but are provided at the same functional level of illustration that is normally used at the high level of skill in this art to communicate the basis of developing working programs.

In an embodiment, at block 10, the process of FIG. 1C is programmed for creating, by digitally generating, and storing a machine learning statistical topic model in computer memory, the topic model being programmed to model call transcript data representing words spoken on a call as a function of one or more topics of a set of topics. The techniques of U.S. Pat. No. 11,410,644 can be used to create and store a machine-learning model in memory based on Bayesian belief network techniques. The set of topics modeled comprise an optional set of pre-seeded topics and a set of non-pre-seeded topics. The topic model is programmatically pre-seeded with a set of keyword groups, each keyword group associating a respective set of keywords with a topic of the set of pre-seeded topics. The model is programmatically trained using labeled training data, unlabeled training data, or a mixture of both.

A classifier is conjoined to the topic model to create a classifier model. The classifier defines a joint probability distribution over topic vectors and one or more observed labels. The classifier is programmatically trained using only the labeled training data if it is provided.

With these preparatory steps complete, a computer system with the classifier model can receive an electronic document, including but not limited to target call transcript data comprising an electronic digital representation of a verbal transcription of a target call. The method is programmed for determining, using the topic model, at least one of one or more topics of the target call, and using the classifier model, one or more classifications of the target call, and digitally storing the target call transcript data with additional data indicating the determined one or more topics of the target call and/or the determined one or more classifications of the target call.

At block 12, the process is programmed for accessing, in computer storage, a first digitally stored electronic document comprising a first text. The first text can be the target for a comparison of its similarity to the target call transcript data or other data that has been previously processed at block 10 using the model. The document of block 12 could comprise another stored call transcript, a word processing document, a web page, or any other electronic document.

Figure 5:
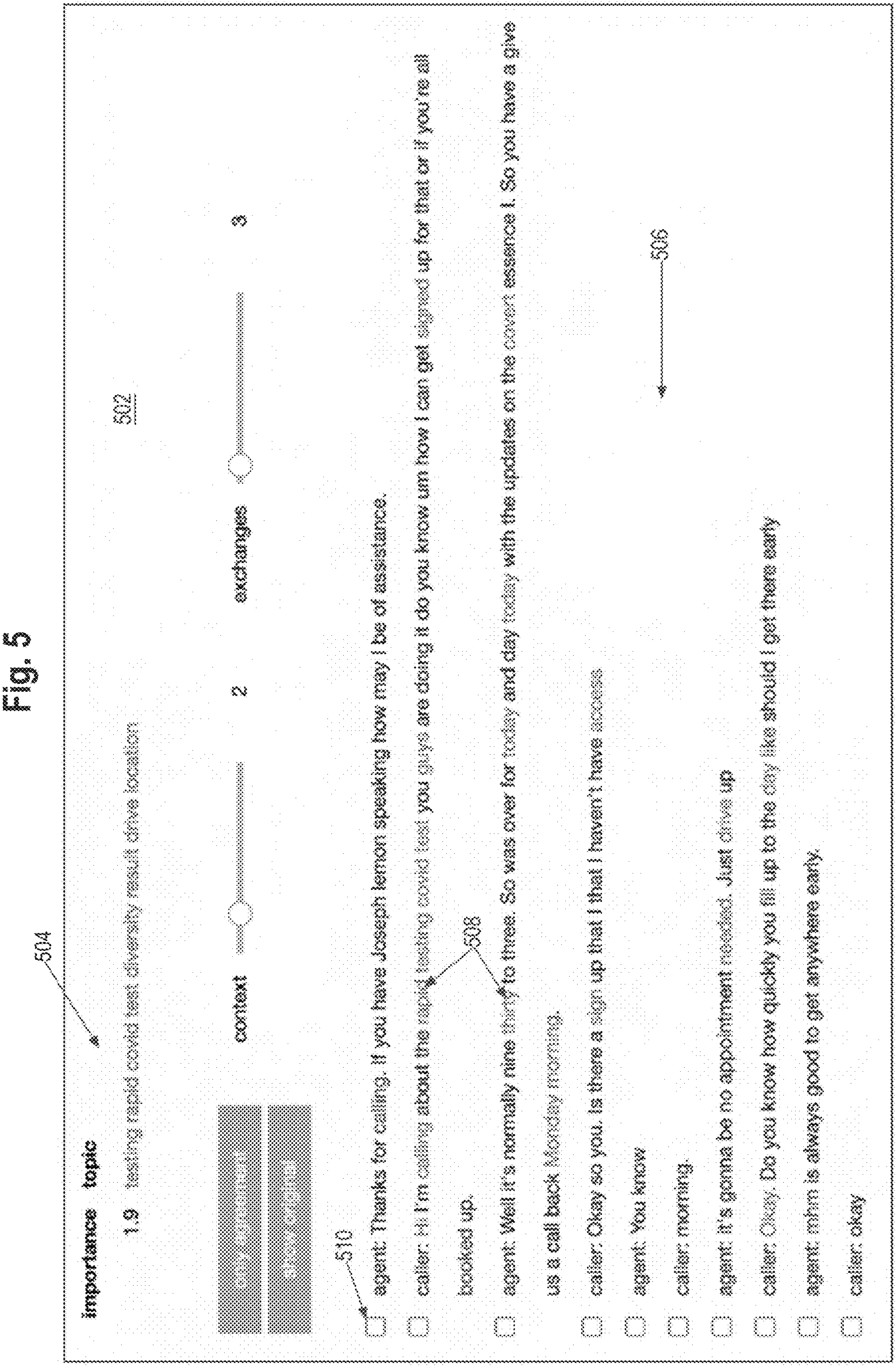
FIG. 5 illustrates an example computer display device with a graphical user interface that can be programmed in one embodiment.
Figure 6A:
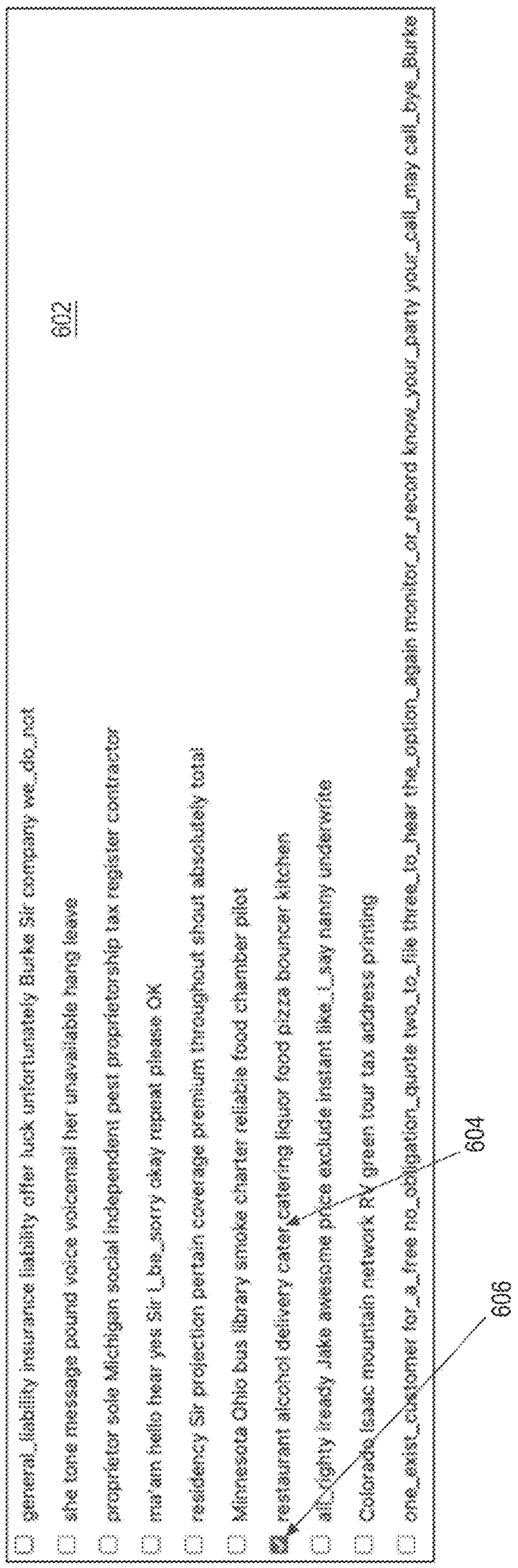
FIG. 6A illustrates an example of a portion of the graphical user interface of FIG. 5 displaying results from the query.
Figure 6B:
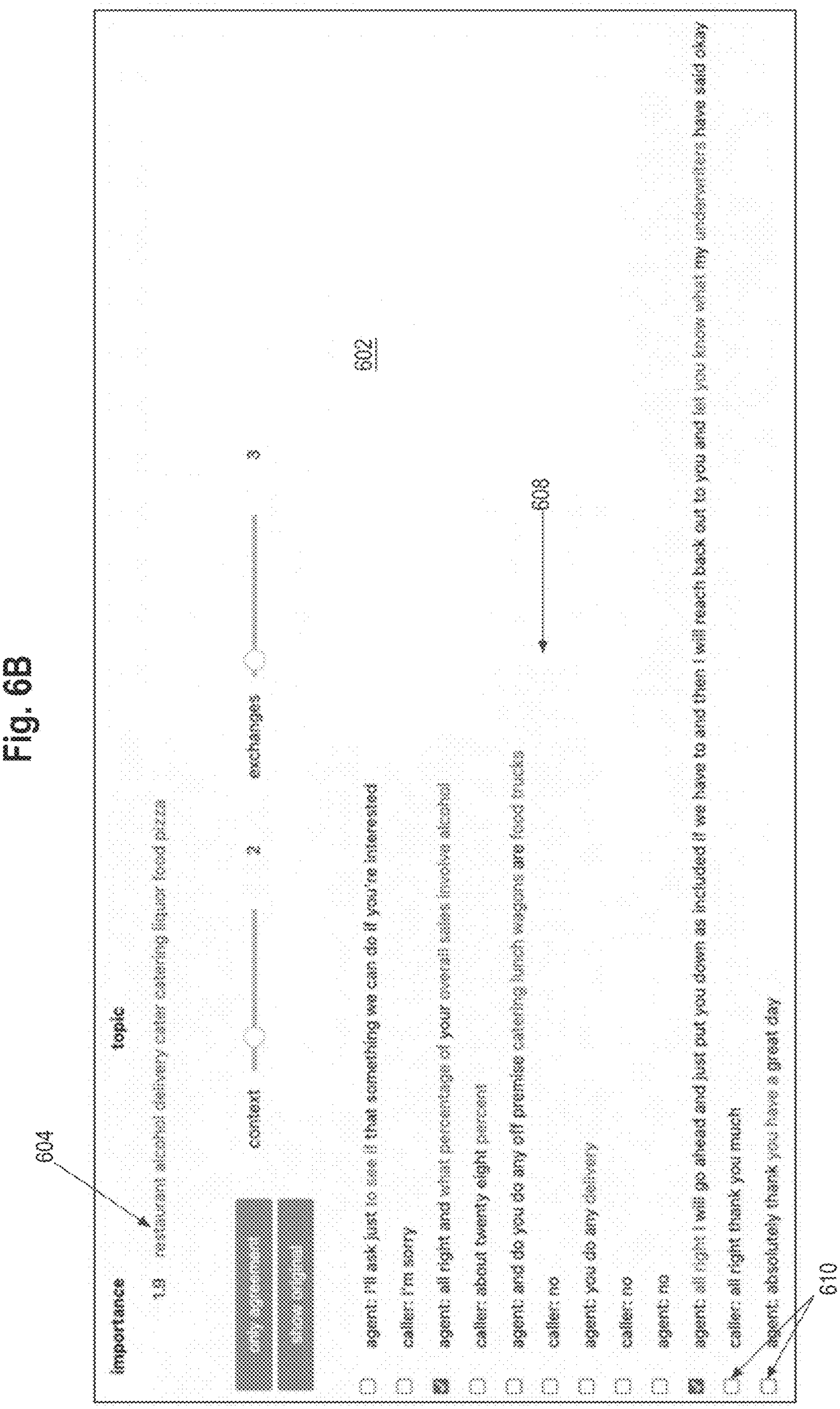
FIG. 6B illustrates an example of the graphical user interface of FIG. 5 displaying results from the query with the modified search criterion.

At block 14, the process is programmed for receiving computer input specifying a search query comprising one or more search terms and processing the search query using the classifier model to output a query topic vector representing the thematic content of the search query. Examples are provided in other sections herein and are shown in FIG. 5, FIG. 6A, FIG. 6B; for example, elements 504, 604 can be considered visualizations of query topic vectors, which also consist of probability distributions of the associated terms.

At block 16, the process is programmed for processing the first text using the classifier model to output and store in the computer memory a first plurality of topic vectors each representing a topic in the text. The first plurality of topic vectors can be viewed as candidates for similarity comparison to the query topic vector.

At block 18, the process is programmed for, using the query topic vector and the first plurality of topic vectors, calculating a plurality of similarity values, each of the similarity values representing a similarity of the query topic vector to a particular topic vector among the first plurality of topic vectors. Specific techniques using distance metric algorithms or similar measures of similarity are described herein in other sections, and any of those algorithms can be used at block 18.

At block 20, the process is programmed for outputting a visual display that specifies one or more topic vectors among the first plurality of topic vectors having one or more corresponding similarity values that are greater than a specified threshold similarity value. In some embodiments, the similar topic vectors can be displayed in an order of similarity, or with an integer or real number representing similarity. In other embodiments, the visual display can include an unordered set of topic vectors with no numeric data.

In some embodiments, before calculating the plurality of similarity values, the process is programmed for sorting the first plurality of topic vectors according to a corpus-level prevalence of the topics represented in the first plurality of topic vectors, thereby creating a first set of sorted topic vectors, and executing the calculating according to an order of the first set.

In some embodiments, the process is further programmed for accessing a second digitally stored electronic document comprising a second text; processing the second text using the trained topic model to output a second plurality of topic vectors each representing another topic in the second text; sorting the second plurality of topic vectors based upon the corpus-level prevalence of the topics represented in the second plurality of topic vectors, thereby creating a second set of sorted topic vectors; comparing the first set to the second set; outputting a visual display indicating an overlap of the topics in the first set and the second set. In an embodiment, the process is programmed for performing the similarity calculation by calculating a distance metric that measures the similarity of the first set and the second set. The distance metric can be calculated as any of a Hellinger distance, a Jensen-Shannon divergence, a total variation distance, or a Wasserstein metric.

In some embodiment, the process is programmed for outputting a second visual display indicating prevalence values corresponding to the prevalence, in the corpus comprising the first text, the second text, and a plurality of other texts, of the topics in the first set and the second set.

In some embodiments, the search query can be a first structured query language (SQL) query to transform the search query into the query topic vector. In this embodiment, calculating the plurality of similarity values can use a second SQL query to calculate a distance metric.

In some embodiments, the classifier model is initially untrained, and the process of FIG. 1C is further programmed for receiving a plurality of training queries, each of the training queries comprising one or more terms; using the classifier model, a corpus of digitally stored text documents, and the plurality of training queries, inferentially processing each of the training queries to output a set of training topics corresponding to inferred thematic contents of the training queries; using the classifier model and the corpus, processing the corpus to output a set of document topics corresponding to inferred thematic contents of the text documents in the corpus; calculating a plurality of training similarity values that measure similarities of the training topics to the document topics; identifying a set of similar text documents that have training similarity values greater than a specified similarity threshold; visually outputting portions of the similar text documents that are associated with document topics that are similar to the training topics. Such an embodiment also can be programmed for visually highlighting one or more words of the portions of the text documents that are similar to one of the training queries. Such embodiments also can include receiving input specifying one or more of the portions; in response to the input, updating the training queries by performing one of adding the portions that were specified via the input to the plurality of training queries, or replacing the plurality of the training queries with the portions that were specified via the input; and repeating the process using the training queries.

2.3 Description of Example Dataset

Figure 2:
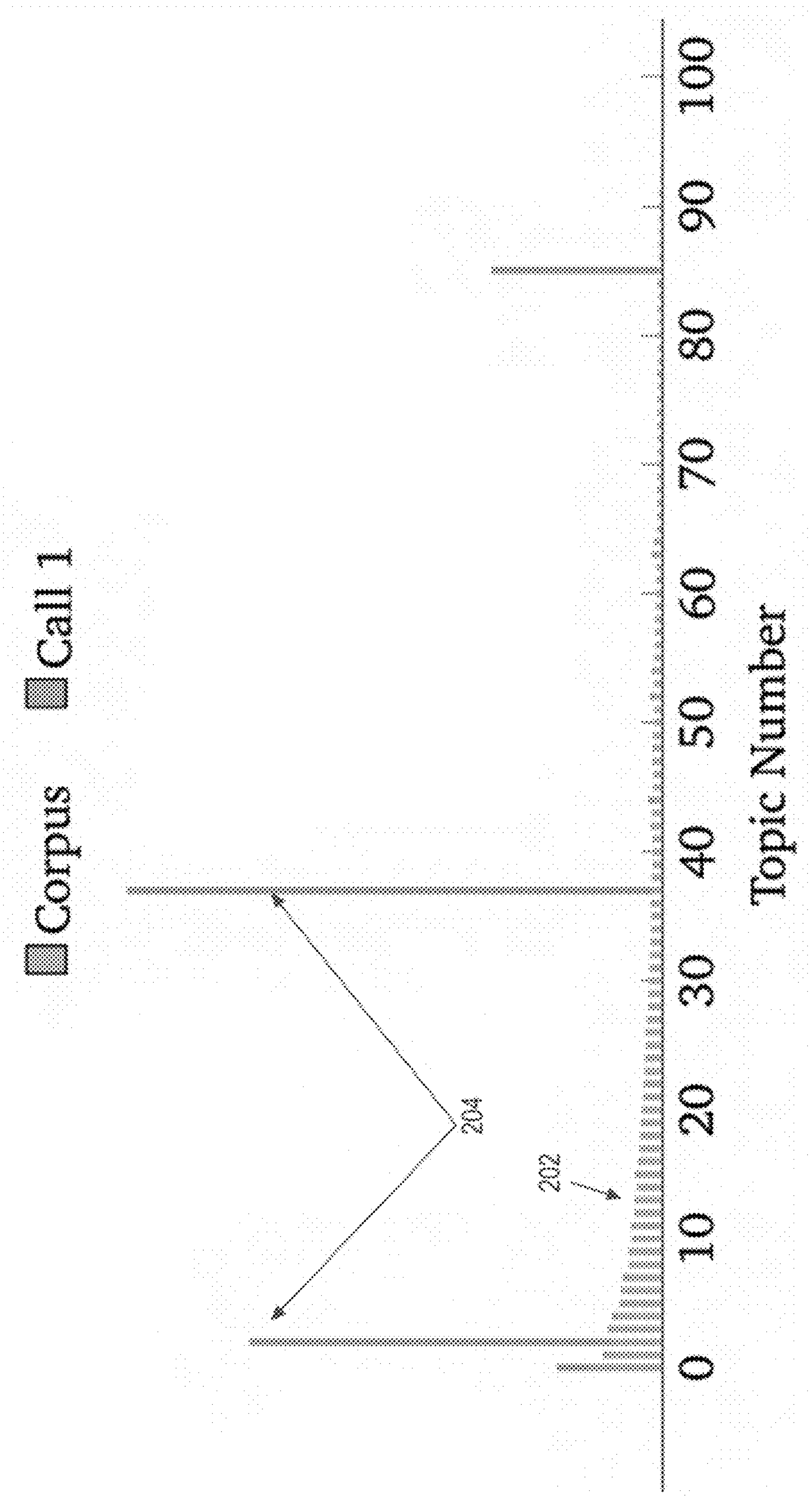
FIG. 2 illustrates topics sorted by frequency and indexed by rank.

A model like that described in the preceding section is fit to or trained on, digitally stored electronic text representations of transcripts of a set of calls. The dataset may be labeled in part and may be augmented with keyword definitions. To facilitate a clear example, assume that the dataset comprises unlabeled calls of consumers to a tree-trimming service. In one experiment, the inventor executed the model of FIG. 1B in an unsupervised fashion on 20,000 unlabeled calls to determine recurring themes in the dataset. These themes are represented as topics, which are probability distributions over words, conditioned on the theme being discussed. Example topics could include the following, in which each topic is denoted by its most representative words:

Topics credit expiration card invoice pay visa payment receipt okay dollar invoice pay payment dollar bill corporate account mail balance check dollar hundred minimum thousand okay five cost price three fifty stump grind remove grinding stomp ground removal stamp grinder dump dormant winter prune schedule september december percent discount incentive year treatment fertilization okay fertilizer fertilize do injection renewal deep storm branch damage fall limb big the down of roof lawn grass weed fertilizer application control fertilize seed do aeration spray crab apple gypsy moth scab caterpillar worm treatment spring oclock tomorrow eleven appointment thirty twelve ten today reschedule at cancel reschedule appointment tomorrow oclock okay schedule thank for The topics shown in the table above are learned from the entire dataset. In addition to learning the representative words for each topic, the model learns how frequently each topic occurs, over the entire dataset, and for each individual call. FIG. 2 illustrates topics sorted by frequency and indexed by rank: Topic 0 is the most frequent topic; Topic 1 is the second most frequent, and so on. First bars 202 show the corpus-wide probability distribution $\alpha$. In the example of FIG. 2, about ten topics account for half of everything spoken. Individual calls vary significantly from this average. Second bars 204 show the distribution $\Theta$ for a randomly selected call. Based on FIG. 2, it will be apparent that the call does not contain every topic, and that its distribution is distinct from the corpus mean. For example, Topic 85 is rare over the complete corpus but is quite prominent in the particular call of FIG. 2. Such variability and uniqueness characterize most human conversations.

These properties of the topic representation enable the model herein to create a distinctive representation of any input text. Moreover, this representation is directly interpretable in terms of the input's thematic content as inferred from the original training dataset.

2.4 Semantic Similarity Measurement

In an embodiment, topic vectors may be used to measure the similarity between any pair of calls. Once the model of FIG. 1B is trained, it can transform any text input into its topic representation. Embodiments are described for pairs of calls, for comparing calls to a free-form search query, and for or comparing portions of a call to a query. Any two types of text may be compared using this technique, though they should be related in some way to the original training dataset for the results to be meaningful.

2.4.1 Calls with Virtually No Semantic Overlap

Figure 3:
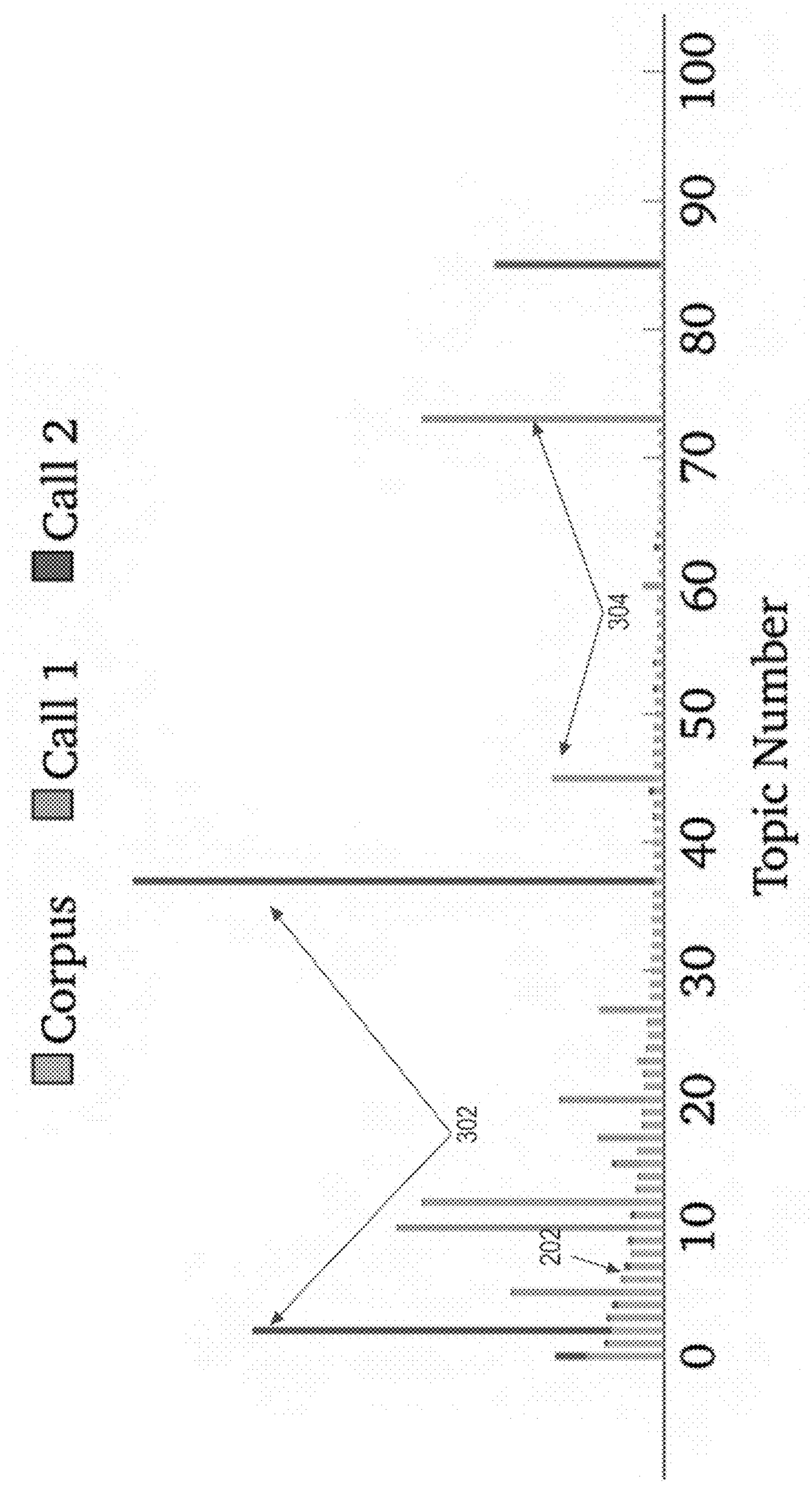
FIG. 3 illustrates the distribution of FIG. 2 with additional bars to indicate corpus-wide prevalence.

In the first example, two calls are shown, with virtually no semantic overlap. The model of FIG. 1B represents each call as comprised of a multiplicity of topics, or recurring themes in the dataset. These topics can be enumerated and sorted in decreasing order of their corpus-wide prevalence. FIG. 3 illustrates the distribution of FIG. 2 with additional bars to indicate two new calls denoted call 1 (at bars 304) and call 2 (at bars 302). In FIG. 3, each bar 302 represents a distinct topic, and the height of the bar denotes how frequently that topic appears in call 2. FIG. 3 shows an example in which about 25-30 topics account for the bulk of the content on the calls; however, there is a long tail of distinct topics. This is a typical feature of natural language.

The bars 202 in FIG. 3 represent the corpus-level prevalence of each topic; in a sense, it represents an "average" call. The bars 304, 302 in FIG. 3 show the thematic content of two specific calls. Note that individual calls differ appreciably from the corpus-level prevalence shown in bars 202; real conversations are highly individualistic and are not well represented by the average. Note also that each call consists of only a small number of topics. Moreover, even though topic numbers "73" and "85" are rare in the complete corpus, they are common in Call 1 and Call 2, respectively. Thus, this thematic representation of calls is both distinctive and parsimonious.

In this example, the two calls show virtually no thematic overlap: bars 304, 302 occur in different locations in the plot, so that Call 1 and Call 2 consist of disjoint sets of topics. An embodiment can measure the similarity between pairs of calls by calculating a similarity value, which can be viewed as a form of distance metric. Embodiments can use any distance metric $d(\theta_1, \theta_2)$ which meets the constraints:

| | |
|---|---|
| $d(\theta_1, \theta_2)^3 0$ | (non−negative) |
| $d(\theta_1, \theta_2) = 0 \text{ iff } \theta_1 = \theta_2$ | (identity) |
| $d(\theta_1, \theta_2) = d(\theta_2, \theta_1)$ | (symmetry) |
| $d(\theta_1, \theta_3) < d(\theta_1, \theta_2) + d(\theta_2, \theta_3)$ | (triangle inequality) |
| $d(\lambda\theta_1 + (1-\lambda)\theta_2, \lambda\eta_1 + (1-\lambda)\eta_2 \leq \lambda d(\theta_1, \eta_1) + (1-\lambda)d(\theta_2, \eta_2)$ | (joint convexity) |

Embodiments operate using probability distributions, which live on a simplex, rather than true Euclidean vectors. Therefore, certain existing distance metrics do not meet the foregoing constraints. Various embodiments can calculate similarity measures using any of the following:

1. The Hellinger distance metric, calculated as:

$$d_H(\theta_1, \theta_2) = \sqrt{\frac{1}{2}\sum_k \left(\sqrt{\theta_{1,k}} - \sqrt{\theta_{2,k}}\right)^2},$$

2. The Jensen-Shannon divergence, calculated as:

$$d_{JS}(\theta_1, \theta_2) = \frac{1}{2}\left[\sum_k \theta_{1,k}\log\left(\frac{\theta_{1,k}}{\frac{1}{2}(\theta_{1,k} + \theta_{2,k})}\right) + \sum_k \theta_{2,k}\log\left(\frac{\theta_{2,k}}{\frac{1}{2}(\theta_{1,k} + \theta_{2,k})}\right)\right],$$

3. The total variation distance is calculated as:

$$d_{TVD}(\theta_1, \theta_2) = \sup_k |\theta_{1,k} - \theta_{2,k}|,$$

4. The Wasserstein metric.

In the example shown above, the distributions have a Hellinger distance of 0.94, indicating near-total dissimilarity.

Because topics represent human-interpretable themes, embodiments can be programmed to visually display topics for inspection to enable an analyst or other user to understand what distinguishes these calls. The topics of each call are shown below. In Call 1, the caller leaves a voicemail requesting an estimate for cleanup from storm damage, and Call 2 consists mostly of hold messages and likely contains no conversation.

Figure 4:
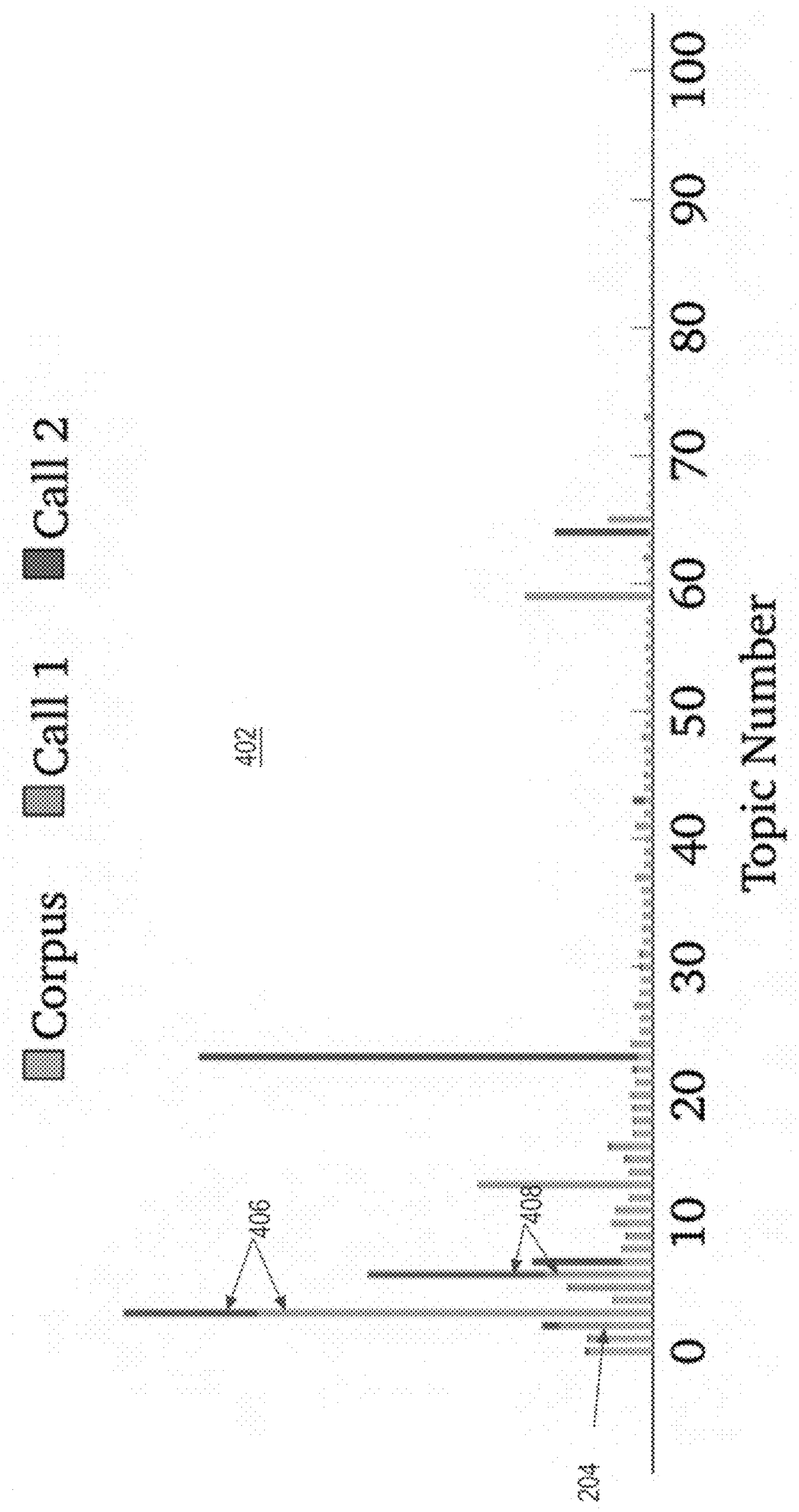
FIG. 4 shows calls with partial semantic overlap.

Call 1 Topics tone message pound press finish option record leave zero hang storm branch damage fall limb big the down of roof the front side house neighbor yard tree property backyard branch estimate an come give out appointment tree to and for Call 2 Topics listing press status google suspend business cough insure active delete dial extension pm message pound tone denver normal hour press message tone hour pm pound press seven business four return emergency endanger tone message press immediate pound return quality 2.4.2 Calls with Substantial Semantic Overlap FIG. 4 shows calls with partial semantic overlap. In the example of FIG. 4, a graph 402 comprises first bars 204 representing the occurrences of topics in a corpus as a whole, second overlapping bars 406 and third overlapping bars 408. The overlapping bars indicate the presence of a particular topic in both Call 1 and Call 2. Bars 406 and bars 408 largely overlap at topics 3 and 6, meaning that the calls represented respectively by the individual bars of second overlapping bars 406, the same two calls represented by the individual bars of third overlapping bars 408, have two prominent topics in common. Since these topics have low ranks, they are also common in the dataset as a whole.

In an embodiment, a user interface can be programmed to receive input to specify an inspection of the calls represented in the bars. In one embodiment, in response to input to specify an inspection of the calls, the system is programmed to display portions of call transcripts corresponding to the topics of the calls. As an example, Call 1 and Call 2 each may relate to callers who want to schedule appointments:

Call 1 Topics

Okay week sooner book yeah backlog to out be right okay right all let yeah bye thank here see hold oclock okay tuesday thursday wednesday monday eleven thirty week next
okay san antonio zip allison code yes expert oclock Call 2 Topics
oclock okay tuesday thursday wednesday monday eleven thirty week next
storm branch damage fall limb big the down of roof
chip dump mulch pile wood truck chipper ship drop load
okay right all let yeah bye thank here see hold The first caller appears to be re-scheduling an appointment, while the second caller appears to be discussing specific services. Both callers discuss scheduling, however. The topic distributions for Call 1 and Call 2 have a Hellinger distance of 0.38, indicating a substantial degree of overlap. This is a fairly high similarity for calls, since two calls are unlikely to be exactly identical in all of their thematic content.

2.5 Scalable Implementation in Database Systems

In one embodiment, calculating a similarity measure or distance metric can be implemented as a structured query language (SQL) function in a data repository or relational database system. An SQL implementation can permit rapid computation, since search queries may be efficiently distributed across a large number of servers if needed. TABLE 1 presents an example code for a SQL function.

TABLE 1

EXAMPLE SQL FUNCTION

```
CREATE OR REPLACE FUNCTION
hellinger_sum(x ARRAY<FLOAT>)
  RETURNS FLOAT
  RETURN
        sqrt(.5*AGGREGATE(x, 0::float, (acc, value) -> acc + value));
CREATE OR REPLACE FUNCTION
hellinger_distance(theta_1 ARRAY<FLOAT>, theta_2 ARRAY<FLOAT>)
  RETURNS FLOAT
  RETURN
  hellinger_sum(
    TRANSFORM(
      arrays_zip(theta_1, theta_2),
         x -> pow(sqrt(x['theta_1']) - sqrt(x['theta_2']), 2)))
```

For example, an embodiment can be programmed to transform an example query into a topic vector denoted "theta_query" using the model. A further query can be configured to find the 25 most similar calls from a saved dataset denoted "dataset" as shown in TABLE 2:

TABLE 2

EXAMPLE SQL FUNCTION

```
WITH t as (
  SELECT
    CU_ID,
      hellinger_distance(theta_query, theta) as distance,
    doc
  FROM dataset
)
SELECT *
FROM t
ORDER BY distance ASC
LIMIT 25
```

2.6 Review of Examples

The examples described in the preceding sections show how the topics discovered by the model may be used to identify similar and dissimilar calls. The ranking is not binary but provides degrees of similarity. Moreover, since the topics are designed to be human-interpretable, embodiments can be programmed to show excerpts of transcripts to indicate why the model determined two calls were or were not similar. The user could, if desired, choose to have the ranking ignore certain topics deemed to be irrelevant to the task. Thus, the property of interpretability not only explains the rankings but also permits the user a great deal of control over the matches.

Because the model can transform any text input into a topical representation, different applications can use the model to process data other than transcripts of pairs of calls. Example applications include a search engine for text or documents that ranks the text or document by similarity to a query entered by the user; a search engine that ranks particular exchanges between callers and agents, or other subsets of calls; a search engine that can locate other calls, text, or documents that are similar to input specifying a portion of a first call, text, or document.

3. Addressing Cold Start in Active Learning 3.1 Overview

When the model of FIG. 2 is applied to a semantic or thematic search engine, the effect of one implementation can be to receive free-form queries as natural text and use a trained model to infer the thematic content of the queries. The implementation can be programmed to sort calls based on thematic similarity to the queries using the same mechanism detailed in the previous section. Functionally, the approach is the same as for the ranking described in the previous section, except that a free-form query is the basis of comparison, rather than a particular call.

In an embodiment, the model can be applied to the problem of "cold start" in active learning. Active learning is a special case of machine learning in which a partially trained model helps filter the data as it is labeled; thus, the model thus plays an active role in its own training. Active learning can significantly reduce the work required to train machine learning models, but it requires a partially trained model at the outset. The initial batch of training data therefore cannot be obtained via active learning, and other means must be found; this is known as the cold start problem. In an embodiment, the model of FIG. 2 is executed to perform a semantic search; this is effectively a zero-shot model, which returns relevant results without any labeled data. A first search can identify a first batch of calls with which to start an active learning loop.

As an example, assume that a user is associated with a network of healthcare clinics and assume further that a goal is to build a machine learning model to flag calls about SARS CoV-2. The user might enter the following queries as examples of what might be asked on a call:

Query Examples (Natural Language Input)
I want to know what precautions you are taking for covid.
Do I need to take a test before I can come into an appointment?
Have you closed your offices for the quarantine?
Do I need to wear a mask to come into the building?
Do you offer covid tests?
Can I get the covid vaccine?
Do you offer booster shots for the covid nineteen vaccine?

Since the model of FIG. 2 is flexible about how it handles input, these queries could be submitted together or separately. Assume they were entered in bulk as a single query. The model then infers the thematic content of these queries as a set of topics:

Query Topics (Semantic Inference)
do covert diversity result drive location covid test rapid precaution vaccine positive you temple wear fever mask quarantine
expose apply e click application online form link fill website vaccine
receive first cancel dose covid second schedule appointment vaccination shot
wait available patient text worker schedule appointment list waiting
vaccination park drive front plaza locate where there right building parking
patient opportunity visit definitely offer doctor appointment you Medicare we
shortly to_make_an www dash vaccine covid_nineteen_vaccine continue_to_hold Importantly, the topics contain words and information that are not in the queries. These topics represent information that the model of FIG. 2 learned from the corpus which is pertinent to the query. After the foregoing step, an embodiment can be programmed to search for calls with similar thematic content to the query, following the methodology outlined above. Since the model has word-level information about the topics in the call, an embodiment can be programmed to present an augmented interface for the search. For example, the interface can show only the portions of the call pertinent to the search, and the interface can highlight particular words which influenced the match. FIG. 5 illustrates an example computer display device with a graphical user interface that can be programmed in one embodiment. In FIG. 5, a GUI 502 comprises a topic region 504 that displays one or more topics of calls that match the query. This represents a high-level summary of the call and connects the call to the corpus as a whole. The GUI 502 further comprises a transcript region 506 that displays a transcript of the call. Since topic information for each word is available, the GUI 502 can be programmed to filter the transcript to only show portions relevant to the search, and region 506 represents such a filtered portion. Thus, while a call could be 40 minutes long, region 506 can show only the most pertinent passages. In an embodiment, in region 506, one or more words such as words 508 are displayed using visually distinct attributes, such as color, highlighting, or other treatment that causes the words to stand out in the region. This combination of features improves the efficiency of reviewing the call and assessing how well the call represented in region 506 matches the topic of region 405. Rather than listening to potentially dozens of calls to find an example, a search implementation can rapidly focus on a target and use an augmented transcript in region 506 to assess the match at a glance.

In the example of FIG. 5, certain words 508 are highlighted as especially relevant, but those words were not present in the initial query. The model of FIG. 2 used auxiliary information derived from the corpus to learn that these words are associated with the query. For example, the words "rapid" and "testing" are the subject of the call and were identified by the model as pertinent, but neither word appears in the query. Further, the word "covert" represents an error in transcribing the word "COVID," again automatically identified by the model as indicated by highlighting in the transcript.

In one embodiment, GUI 502 comprises a plurality of GUI widgets 510, each of the widgets being associated with a particular line or block of the transcript of region 506. GUI widgets 510 can be programmed as checkboxes, buttons, or other elements that are capable of visual selection using a pointing device or another input device. In an embodiment, GUI 502 is programmed to receive input to one or more of the widgets 510 to indicate that the user is confirming that the associated portion of the transcript matches the query. In an embodiment, in response to the selection of one or more passages, the selected passages are added to the query to refine the search. Alternatively, the selected passages can replace the original query, enabling the user to shift direction. Since searching is fast, this operation can be done in real-time as the user checks calls. This procedure can help users quickly refine their search to a particular set of conversation topics. Users could use this approach to review their data and/or curate training data for other models.

3.2 Auditing and Modifying the Search Criterion

Embodiments can be programmed to receive input to modify the search criterion and repeat the processes described above. The effect of input to modify a search criterion is not to change the original query in the hope of obtaining a better result, but to directly modify the criterion operating underneath the hood, thus effectively modifying the internal algorithm, and fine-tuning it for a specific task.

To illustrate the function of such an embodiment, assume that a user who sells business insurance runs the query "I was looking to get a quote." FIG. 6A illustrates an example of a portion of the graphical user interface of FIG. 5 displaying results from the query. Such a query is broad and will map to many topics. In GUI 602 of FIG. 6A, one topic 604 relates to restaurants and the food industry and is displayed in association with a checkbox 606. In an embodiment, input to select checkbox 606 modifies the search criterion. Executing the query with the selection will return results related to that particular topic. FIG. 6B illustrates an example of the graphical user interface of FIG. 5 displaying results from the query with the modified search criterion. Topic 604 now appears as the query at the top of GUI 602. Example calls prominently feature quote inquiries from restaurants, as region 608 shows for an example transcript. Checkboxes 610 are associated with lines of a transcript and can be selected or deselected to shift the search based on specific content, in addition to the abstract topics using checkboxes 606, thus providing the user with a great deal of control over the internal mechanics of the search.

4. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 7:
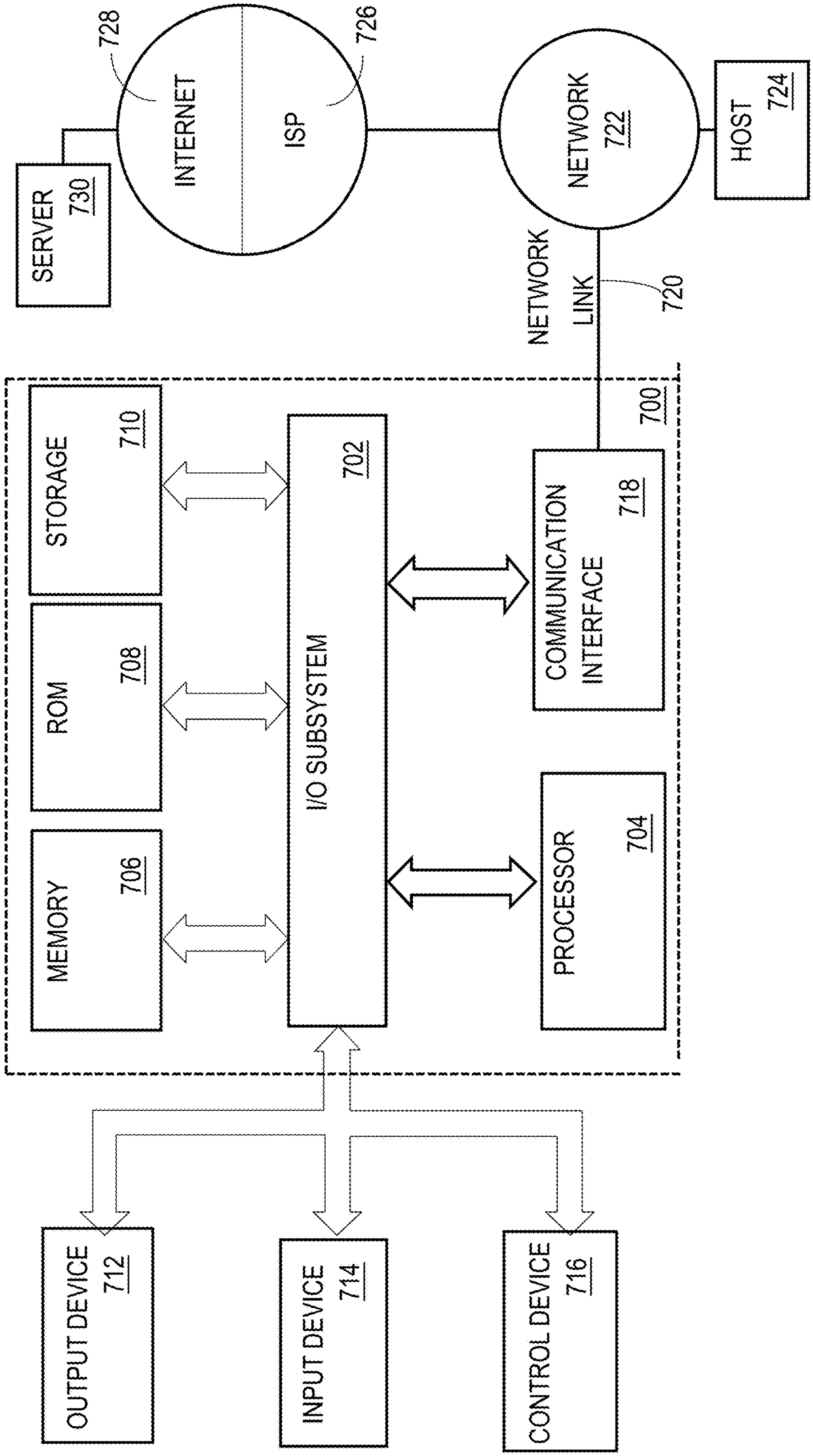
FIG. 7 illustrates a computer system with which one embodiment could be implemented.

FIG. 7 is a block diagram that illustrates an example computer system with which an embodiment may be implemented. In the example of FIG. 7, a computer system 700 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 700 includes an input/output (I/O) subsystem 702 which may include a bus and/or other communication mechanism(s) for communicating information and/or instructions between the components of the computer system 700 over electronic signal paths. The I/O subsystem 702 may include an I/O controller, a memory controller and at least one I/O port. The electronic signal paths are represented schematically in the drawings, for example as lines, unidirectional arrows, or bidirectional arrows.

At least one hardware processor 704 is coupled to I/O subsystem 702 for processing information and instructions. Hardware processor 704 may include, for example, a general-purpose microprocessor or microcontroller and/or a special-purpose microprocessor such as an embedded system or a graphics processing unit (GPU) or a digital signal processor or ARM processor. Processor 704 may comprise an integrated arithmetic logic unit (ALU) or may be coupled to a separate ALU.

Computer system 700 includes one or more units of memory 706, such as a main memory, which is coupled to I/O subsystem 702 for electronically digitally storing data and instructions to be executed by processor 704. Memory 706 may include volatile memory such as various forms of random-access memory (RAM) or other dynamic storage device. Memory 706 also may be used for storing temporary variables or other intermediate information during execution of instructions to be executed by processor 704. Such instructions, when stored in non-transitory computer-readable storage media accessible to processor 704, can render computer system 700 into a special-purpose machine that is customized to perform the operations specified in the instructions.

Computer system 700 further includes non-volatile memory such as read only memory (ROM) 708 or other static storage device coupled to I/O subsystem 702 for storing information and instructions for processor 704. The ROM 708 may include various forms of programmable ROM (PROM) such as erasable PROM (EPROM) or electrically erasable PROM (EEPROM). A unit of persistent storage 710 may include various forms of non-volatile RAM (NVRAM), such as FLASH memory, or solid-state storage, magnetic disk or optical disk such as CD-ROM or DVD-ROM and may be coupled to I/O subsystem 702 for storing information and instructions. Storage 710 is an example of a non-transitory computer-readable medium that may be used to store instructions and data which when executed by the processor 704 cause performing computer-implemented methods to execute the techniques herein.

The instructions in memory 706, ROM 708 or storage 710 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 700 may be coupled via I/O subsystem 702 to at least one output device 712. In one embodiment, output device 712 is a digital computer display. Examples of a display that may be used in various embodiments include a touch screen display or a light-emitting diode (LED) display or a liquid crystal display (LCD) or an e-paper display. Computer system 700 may include other type(s) of output devices 712, alternatively or in addition to a display device. Examples of other output devices 712 include printers, ticket printers, plotters, projectors, sound cards or video cards, speakers, buzzers or piezoelectric devices or other audible devices, lamps or LED or LCD indicators, haptic devices, actuators or servos.

At least one input device 714 is coupled to I/O subsystem 702 for communicating signals, data, command selections or gestures to processor 704. Examples of input devices 714 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 716, which may perform cursor control or other automated control functions such as navigation in a graphical interface on a display screen, alternatively or in addition to input functions. Control device 716 may be a touchpad, a mouse, a trackball, or cursor direction keys for communicating direction information and command selections to processor 704 and for controlling cursor movement on display 712. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 714 may include a combination of multiple different input devices, such as a video camera and a depth sensor.

In another embodiment, computer system 700 may comprise an internet of things (IoT) device in which one or more of the output device 712, input device 714, and control device 716 are omitted. Or, in such an embodiment, the input device 714 may comprise one or more cameras, motion detectors, thermometers, microphones, seismic detectors, other sensors or detectors, measurement devices or encoders and the output device 712 may comprise a special-purpose display such as a single-line LED or LCD display, one or more indicators, a display panel, a meter, a valve, a solenoid, an actuator or a servo.

When computer system 700 is a mobile computing device, input device 714 may comprise a global positioning system (GPS) receiver coupled to a GPS module that is capable of triangulating to a plurality of GPS satellites, determining and generating geo-location or position data such as latitude-longitude values for a geophysical location of the computer system 700. Output device 712 may include hardware, software, firmware and interfaces for generating position reporting packets, notifications, pulse or heartbeat signals, or other recurring data transmissions that specify a position of the computer system 700, alone or in combination with other application-specific data, directed toward host 724 or server 730.

Computer system 700 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 700 in response to processor 704 executing at least one sequence of at least one instruction contained in main memory 706. Such instructions may be read into main memory 706 from another storage medium, such as storage 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 710. Volatile media includes dynamic memory, such as memory 706. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 702. Transmission media can also take the form of acoustic or light waves, such as those generated during radio-wave and infra-red data communications.

Various forms of media may be involved in carrying at least one sequence of at least one instruction to processor 704 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 700 can receive the data on the communication link and convert the data to a format that can be read by computer system 700. For instance, a receiver such as a radio frequency antenna or an infrared detector can receive the data carried in a wireless or optical signal and appropriate circuitry can provide the data to I/O subsystem 702 such as place the data on a bus. I/O subsystem 702 carries the data to memory 706, from which processor 704 retrieves and executes the instructions. The instructions received by memory 706 may optionally be stored on storage 710 either before or after execution by processor 704.

Computer system 700 also includes a communication interface 718 coupled to bus 702. Communication interface 718 provides a two-way data communication coupling to network link(s) 720 that are directly or indirectly connected to at least one communication networks, such as a network 722 or a public or private cloud on the Internet. For example, communication interface 718 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 722 broadly represents a local area network (LAN), wide-area network (WAN), campus network, internetwork or any combination thereof. Communication interface 718 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 718 sends and receives electrical, electromagnetic or optical signals over signal paths that carry digital data streams representing various types of information.

Network link 720 typically provides electrical, electromagnetic, or optical data communication directly or through at least one network to other data devices, using, for example, satellite, cellular, Wi-Fi, or BLUETOOTH technology. For example, network link 720 may provide a connection through a network 722 to a host computer 724.

Furthermore, network link 720 may provide a connection through network 722 or to other computing devices via internetworking devices and/or computers that are operated by an Internet Service Provider (ISP) 726. ISP 726 provides data communication services through a world-wide packet data communication network represented as internet 728. A server computer 730 may be coupled to internet 728. Server 730 broadly represents any computer, data center, virtual machine or virtual computing instance with or without a hypervisor, or computer executing a containerized program system such as DOCKER or KUBERNETES. Server 730 may represent an electronic digital service that is implemented using more than one computer or instance and that is accessed and used by transmitting web services requests, uniform resource locator (URL) strings with parameters in HTTP payloads, API calls, app services calls, or other service calls. Computer system 700 and server 730 may form elements of a distributed computing system that includes other computers, a processing cluster, server farm or other organization of computers that cooperate to perform tasks or execute applications or services. Server 730 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 730 may comprise a web application server that hosts a presentation layer, application layer and data storage layer such as a relational database system using structured query language (SQL) or no SQL, an object store, a graph database, a flat file system or other data storage.

Computer system 700 can send messages and receive data and instructions, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, and/or stored in storage 710, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 704. While each processor 704 or core of the processor executes a single task at a time, computer system 700 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method executed using a computing device, the method comprising:

digitally generating and storing a machine learning statistical topic model in computer memory, the topic model being programmed to model call transcript data representing words spoken on a call as a function of one or more topics of a set of topics, the set of topics being modeled to comprise a set of pre-seeded topics and a set of non-pre-seeded topics, and the one or more topics being modeled as a function of a probability distribution of topics; programmatically pre-seeding the topic model with a set of keyword groups, each keyword group associating a respective set of keywords with a topic of the set of pre-seeded topics; programmatically training the topic model using unlabeled training data; conjoining a classifier to the topic model to create a classifier model, the classifier defining a joint probability distribution over topic vectors and one or more observed labels; programmatically training the classifier model using labeled training data; receiving target call transcript data comprising an electronic digital representation of a verbal transcription of a target call; programmatically determining, using the classifier model, at least one of one or more topics of the target call or one or more classifications of the target call; digitally storing the target call transcript data with additional data indicating the determined one or more topics of the target call and/or the determined one or more classifications of the target call;

accessing, in computer storage, a first digitally stored electronic document comprising a first text;

receiving computer input specifying a search query comprising one or more search terms;

processing the search query using the classifier model to output a query topic vector representing a thematic content of the search query;

processing the first text using the classifier model to output and store in the computer memory a first plurality of topic vectors each representing a topic in the text;

using the query topic vector and the first plurality of topic vectors, calculating a plurality of similarity values, each of the similarity values representing a similarity of the query topic vector to a particular topic vector among the first plurality of topic vectors;

outputting a visual display that specifies one or more topic vectors among the first plurality of topic vectors having one or more corresponding similarity values that are greater than a specified threshold similarity value.

2. The method of claim 1, further comprising:

before the calculating the plurality of similarity values, sorting the first plurality of topic vectors according to a corpus-level prevalence of the topics represented in the first plurality of topic vectors, thereby creating a first set of sorted topic vectors;

executing the calculating according to an order of the first set.

3. The method of claim 2, further comprising:

accessing a second digitally stored electronic document comprising a second text;

processing the second text using the trained classifier model to output a second plurality of topic vectors each representing another topic in the second text;

sorting the second plurality of topic vectors based upon the corpus-level prevalence of the topics represented in the second plurality of topic vectors, thereby creating a second set of sorted topic vectors;

comparing the first set to the second set;

outputting a visual display indicating an overlap of the topics in the first set and the second set.

4. The method of claim 3, further comprising performing the similarity calculation by calculating a distance metric that measures a similarity of the first set and the second set.

5. The method of claim 4, further comprising calculating the distance metric as any of a Hellinger distance, a Jensen-Shannon divergence, a total variation distance, or a Wasserstein metric.

6. The method of claim 3, further comprising outputting a second visual display indicating prevalence values corresponding to the prevalence, in a corpus comprising the first text, the second text, and a plurality of other texts, of the topics in the first set and the second set.

7. The method of claim 1, further comprising executing the processing of the search query using a first structured query language (SQL) query to transform the search query into the query topic vector.

8. The method of claim 7, further comprising calculating the plurality of similarity values using a second SQL query to calculate a distance metric.

9. The method of claim 8, further comprising calculating the distance metric as any of a Hellinger distance, a Jensen-Shannon divergence, a total variation distance, or a Wasserstein metric.

10. The method of claim 1, wherein the first text comprises a digitally stored text transcript of a previously recorded voice call.

11. The method of claim 1, wherein the first text comprises a first digitally stored text transcript of a previously recorded first voice call, and wherein the one or more search terms comprise a selected portion of a second digitally stored text transcript of a previously recorded second voice call.

12. The method of claim 1, each vector in the first plurality of topic vectors being a probability distribution.

13. The method of claim 1, the classifier model being untrained, the method further comprising:

receiving a plurality of training queries, each of the training queries comprising one or more terms;

using the classifier model, a corpus of digitally stored text documents, and the plurality of training queries, inferentially processing each of the training queries to output a set of training topics corresponding to inferred thematic contents of the training queries;

using the classifier model and the corpus, processing the corpus to output a set of document topics corresponding to inferred thematic contents of the text documents in the corpus;

calculating a plurality of training similarity values that measure similarities of the training topics to the document topics;

identifying a set of similar text documents that have training similarity values greater than a specified similarity threshold;

visually outputting portions of the similar text documents that are associated with document topics that are similar to the training topics.

14. The method of claim 13, further comprising visually highlighting one or more words of the portions of the similar text documents that are similar to one of the training queries.

15. The method of claim 13, further comprising:

receiving input specifying one or more of the portions;

in response to the input, updating the training queries by performing one of: adding the portions that were specified via the input to the plurality of training queries; or replacing the plurality of the training queries with the portions that were specified via the input; and repeating the process of claim 13 using the training queries.

16. One or more non-transitory computer-readable storage media storing one or more sequences of instructions which, when executed using a computing device having one or more processors, cause the one or more processors to execute:

digitally generating and storing a machine learning statistical topic model in computer memory, the topic model being programmed to model call transcript data representing words spoken on a call as a function of one or more topics of a set of topics, the set of topics being modeled to comprise a set of pre-seeded topics and a set of non-pre-seeded topics, and the one or more topics being modeled as a function of a probability distribution of topics; programmatically pre-seeding the topic model with a set of keyword groups, each keyword group associating a respective set of keywords with a topic of the set of pre-seeded topics; programmatically training the topic model using unlabeled training data; conjoining a classifier to the topic model to create a classifier model, the classifier defining a joint probability distribution over topic vectors and one or more observed labels; programmatically training the classifier model using labeled training data; receiving target call transcript data comprising an electronic digital representation of a verbal transcription of a target call; programmatically determining, using the classifier model, at least one of one or more topics of the target call or one or more classifications of the target call; digitally storing the target call transcript data with additional data indicating the determined one or more topics of the target call and/or the determined one or more classifications of the target call;

accessing, in computer storage, a first digitally stored electronic document comprising a first text;

receiving computer input specifying a search query comprising one or more search terms;

processing the search query using the classifier model to output a query topic vector representing a thematic content of the search query;

processing the first text using the classifier model to output and store in the computer memory a first plurality of topic vectors each representing a topic in the text;

using the query topic vector and the first plurality of topic vectors, calculating a plurality of similarity values, each of the similarity values representing a similarity of the query topic vector to a particular topic vector among the first plurality of topic vectors;

outputting a visual display that specifies one or more topic vectors among the first plurality of topic vectors having one or more corresponding similarity values that are greater than a specified threshold similarity value.

17. The one or more non-transitory computer-readable media of claim 16, further comprising one or more sequences of instructions which, when executed using the computing device having the one or more processors, cause the one or more processors to execute:

before the calculating the plurality of similarity values, sorting the first plurality of topic vectors according to a corpus-level prevalence of the topics represented in the first plurality of topic vectors, thereby creating a first set of sorted topic vectors;

executing the calculating according to an order of the first set.

18. The one or more non-transitory computer-readable media of claim 17, further comprising one or more sequences of instructions which, when executed using the computing device having the one or more processors, cause the one or more processors to execute:

accessing a second digitally stored electronic document comprising a second text;

processing the second text using the trained classifier model to output a second plurality of topic vectors each representing another topic in the second text;

sorting the second plurality of topic vectors based upon the corpus-level prevalence of the topics represented in the second plurality of topic vectors, thereby creating a second set of sorted topic vectors;

comparing the first set to the second set;

outputting a visual display indicating an overlap of the topics in the first set and the second set.

19. The one or more non-transitory computer-readable media of claim 18, further comprising one or more sequences of instructions which, when executed using the computing device having the one or more processors, cause the one or more processors to execute performing the similarity calculation by calculating a distance metric that measures a similarity of the first set and the second set.

20. The one or more non-transitory computer-readable media of claim 19, further comprising one or more sequences of instructions which, when executed using the computing device having the one or more processors, cause the one or more processors to execute calculating the distance metric as any of a Hellinger distance, a Jensen-Shannon divergence, a total variation distance, or a Wasserstein metric.

21. The one or more non-transitory computer-readable media of claim 18, further comprising one or more sequences of instructions which, when executed using the computing device having the one or more processors, cause the one or more processors to execute outputting a second visual display indicating prevalence values corresponding to the prevalence, in a corpus comprising the first text, the second text, and a plurality of other texts, of the topics in the first set and the second set.

22. The one or more non-transitory computer-readable media of claim 16, further comprising one or more sequences of instructions which, when executed using the computing device having the one or more processors, cause the one or more processors to execute the processing of the search query using a first structured query language (SQL) query to transform the search query into the query topic vector.

23. The one or more non-transitory computer-readable media of claim 22, further comprising one or more sequences of instructions which, when executed using the computing device having the one or more processors, cause the one or more processors to execute calculating the plurality of similarity values using a second SQL query to calculate a distance metric.

24. The one or more non-transitory computer-readable media of claim 23, further comprising one or more sequences of instructions which, when executed using the computing device having the one or more processors, cause the one or more processors to execute calculating the distance metric as any of a Hellinger distance, a Jensen-Shannon divergence, a total variation distance, or a Wasserstein metric.

25. The one or more non-transitory computer-readable media of claim 16, wherein the first text comprises a digitally stored text transcript of a previously recorded voice call.

26. The one or more non-transitory computer-readable media of claim 16, wherein the first text comprises a first digitally stored text transcript of a previously recorded first voice call, and wherein the one or more search terms comprise a selected portion of a second digitally stored text transcript of a previously recorded second voice call.

27. The one or more non-transitory computer-readable media of claim 16, each vector in the first plurality of topic vectors being a probability distribution.

28. The one or more non-transitory computer-readable media of claim 16, the classifier model being untrained, the one or more non-transitory computer-readable media further comprising one or more sequences of instructions which, when executed using the computing device having the one or more processors, cause the one or more processors to execute:

receiving a plurality of training queries, each of the training queries comprising one or more terms;

using the classifier model, a corpus of digitally stored text documents, and the plurality of training queries, inferentially processing each of the training queries to output a set of training topics corresponding to inferred thematic contents of the training queries;

using the classifier model and the corpus, processing the corpus to output a set of document topics corresponding to inferred thematic contents of the text documents in the corpus;

calculating a plurality of training similarity values that measure similarities of the training topics to the document topics;

identifying a set of similar text documents that have training similarity values greater than a specified similarity threshold;

visually outputting portions of the similar text documents that are associated with document topics that are similar to the training topics.

29. The one or more non-transitory computer-readable media of claim 28, further comprising one or more sequences of instructions which, when executed using the computing device having the one or more processors, cause the one or more processors to execute visually highlighting one or more words of the portions of the similar text documents that are similar to one of the training queries.

30. The one or more non-transitory computer-readable media of claim 28, further comprising one or more sequences of instructions which, when executed using the computing device having the one or more processors, cause the one or more processors to execute:

receiving input specifying one or more of the portions;

in response to the input, updating the training queries by performing one of: adding the portions that were specified via the input to the plurality of training queries; or replacing the plurality of the training queries with the portions that were specified via the input; and repeating the process of claim 28 using the training queries.

* * * * *